(12) United States Patent
Hamamoto et al.

(10) Patent No.: US 6,899,452 B2
(45) Date of Patent: May 31, 2005

(54) APPARATUS AND METHOD FOR PREPARATION AND SUPPLY OF POLYMERIZATION INHIBITOR

(75) Inventors: Kei Hamamoto, Himeji (JP); Takeshi Nishimura, Himeji (JP); Kazuhiko Sakamoto, Himeji (JP); Kunihiko Suzuki, Hyogo (JP)

(73) Assignee: Nippon Shokubai Co., Inc., Osaka (JP)

( * ) Notice: Subject to any disclaimer, the term of this patent is extended or adjusted under 35 U.S.C. 154(b) by 126 days.

(21) Appl. No.: 10/246,361

(22) Filed: Sep. 18, 2002

(65) Prior Publication Data

US 2003/0095471 A1 May 22, 2003

(30) Foreign Application Priority Data

Sep. 28, 2001 (JP) ......................................... 2001-303327

(51) Int. Cl.[7] .............................................. B01F 15/02
(52) U.S. Cl. ............................... 366/152.2; 366/153.1; 366/136; 366/349
(58) Field of Search .......................... 366/151.1, 153.1, 366/136, 152.6, 349, 348, 152.1, 152.2

(56) References Cited

U.S. PATENT DOCUMENTS

| 4,077,612 | A | | 3/1978 | Ricciardi | ..................... | 366/102 |
|---|---|---|---|---|---|---|
| 4,773,764 | A | * | 9/1988 | Colombani et al. | ...... | 366/153.1 |
| 5,482,368 | A | * | 1/1996 | Nakamura et al. | ........ | 366/152.2 |
| 5,503,473 | A | * | 4/1996 | Dearing et al. | .......... | 366/152.2 |
| 5,573,333 | A | * | 11/1996 | Dahlman | .................. | 366/152.1 |
| 6,190,461 | B1 | * | 2/2001 | Alack | ....................... | 366/163.2 |

FOREIGN PATENT DOCUMENTS

| DE | 20 18 975 A | 4/1970 |
|---|---|---|
| EP | 1 057 804 A2 | 5/1999 |
| FR | 2 442 794 A | 12/1978 |
| GB | 2 027 720 A | 6/1979 |

* cited by examiner

Primary Examiner—Tony G. Soohoo
(74) Attorney, Agent, or Firm—Mathews, Collins, Shepherd & McKay, P.A.

(57) ABSTRACT

An apparatus for the preparation and supply of a polymerization inhibitor which constantly effects stable supply of a polymerization inhibitor solution adjusted to a prescribed concentration and enables a compound handled at the next step to be prevented from polymerization is provided. The apparatus for the preparation and supply of a polymerization inhibitor has at least two tanks and a stirring device, a liquid level detector, a polymerization inhibitor input port, a concentration-adjusting liquid input port, and a polymerization inhibitor solution feed opening, each being installed in at least one of said tanks.

20 Claims, 11 Drawing Sheets

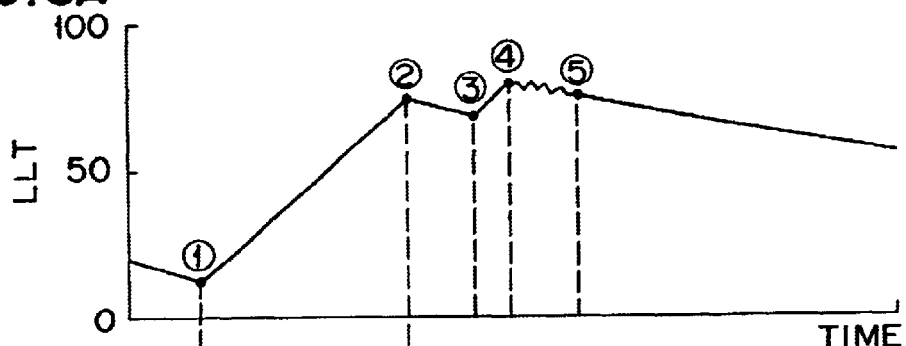
FIG.6A
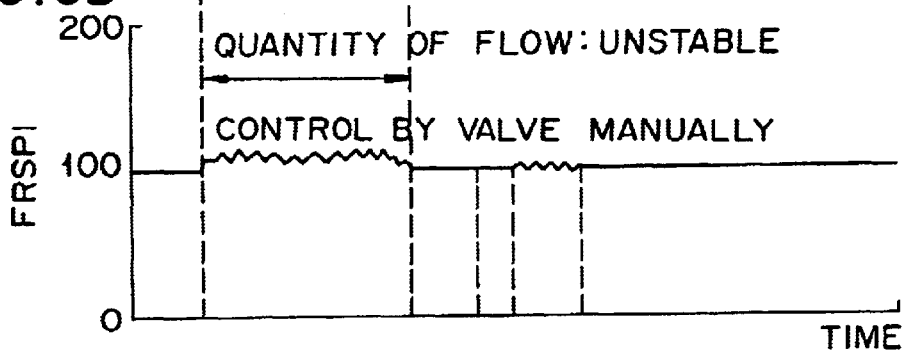
FIG.6B
FIG.6C
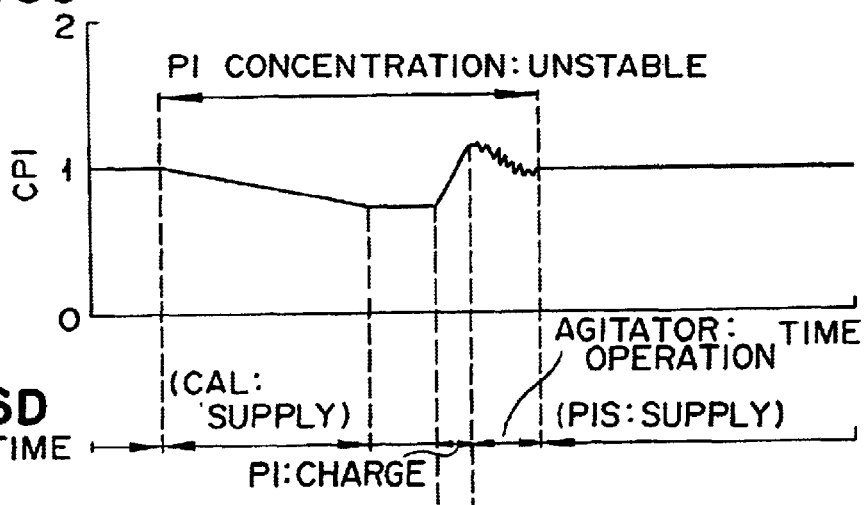
FIG.6D
FIG.6E
FIG.6F

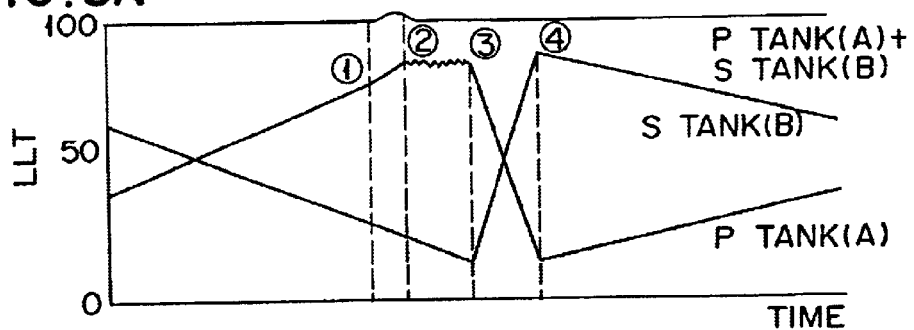
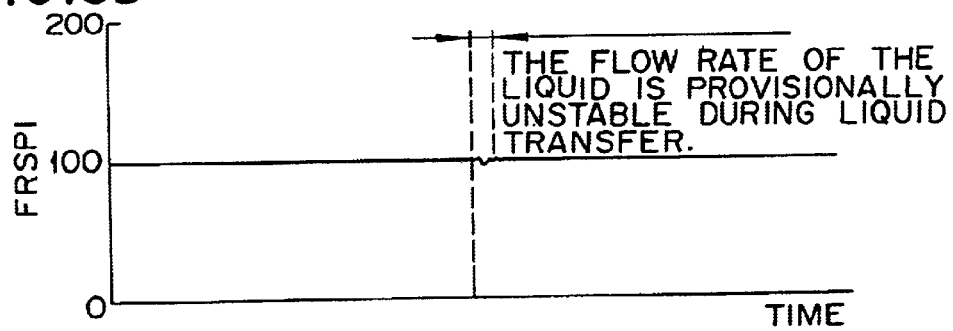
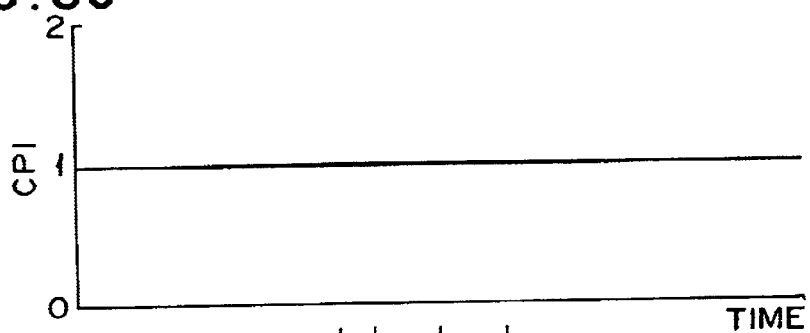
FIG. 8E VALVE 328: CLOSE OPEN CLOSE
FIG. 8F VALVE 313: CLOSE OPEN CLOSE

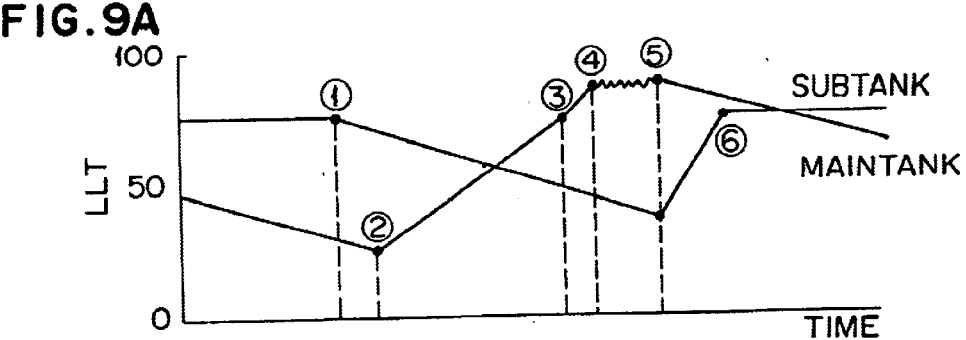
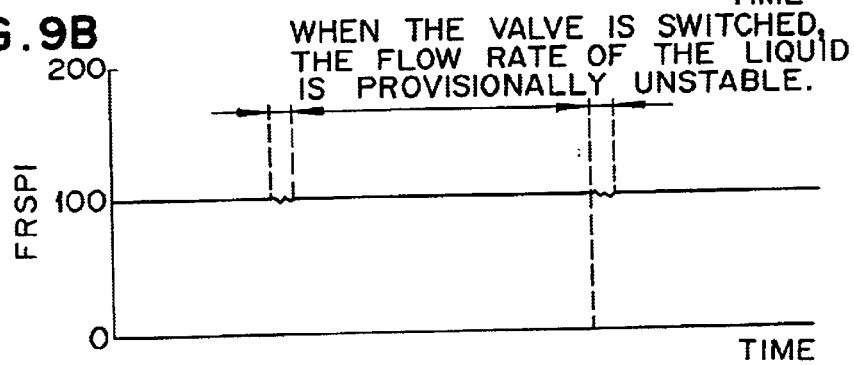
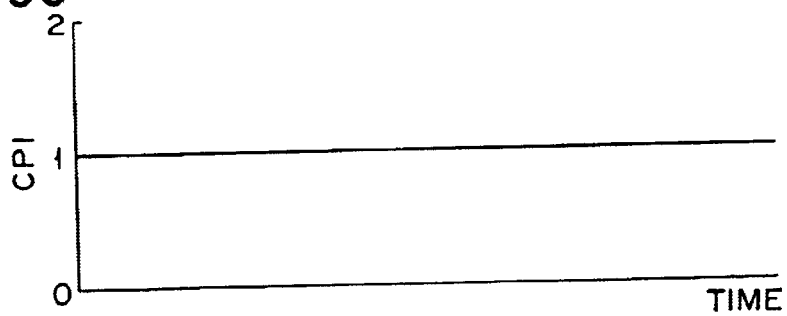
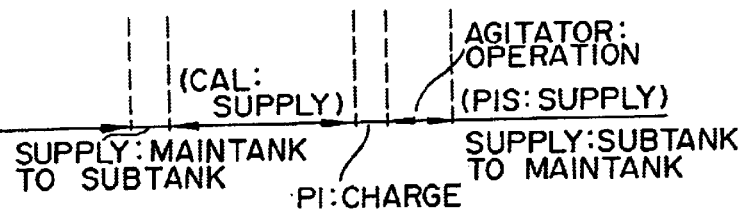

FIG.10A
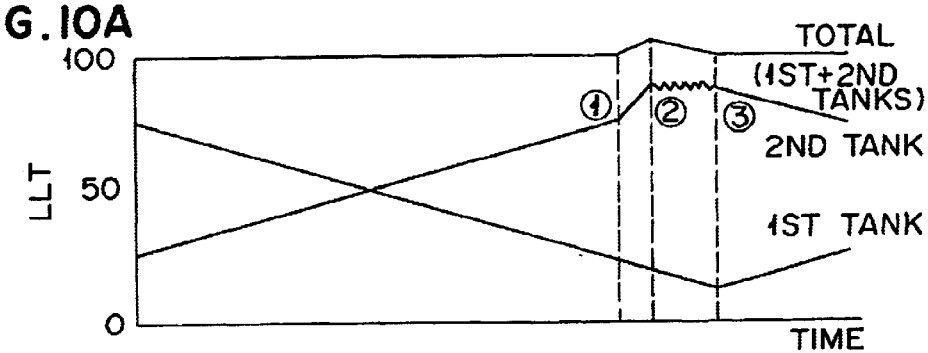
FIG.10B
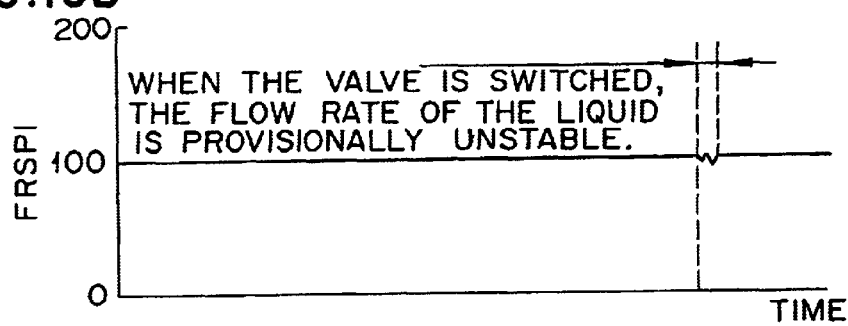
WHEN THE VALVE IS SWITCHED, THE FLOW RATE OF THE LIQUID IS PROVISIONALLY UNSTABLE.
FIG.10C
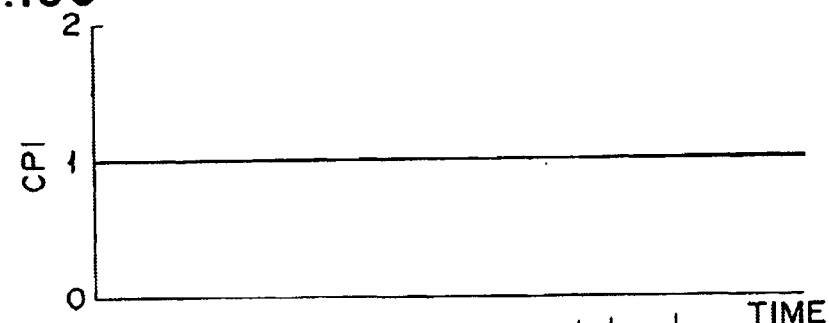
FIG.10D  PI:CHARGE   AGITATOR: OPERATION
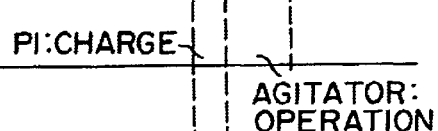
FIG.10E VALVE 513A     CLOSE        OPEN       CLOSE
FIG.10F VALVE 516A            OPEN                CLOSE
FIG.10G VALVE 516B            CLOSE               OPEN
FIG.10H VALVE 514             CLOSE               OPEN
FIG.10I VALVE 515             OPEN                CLOSE

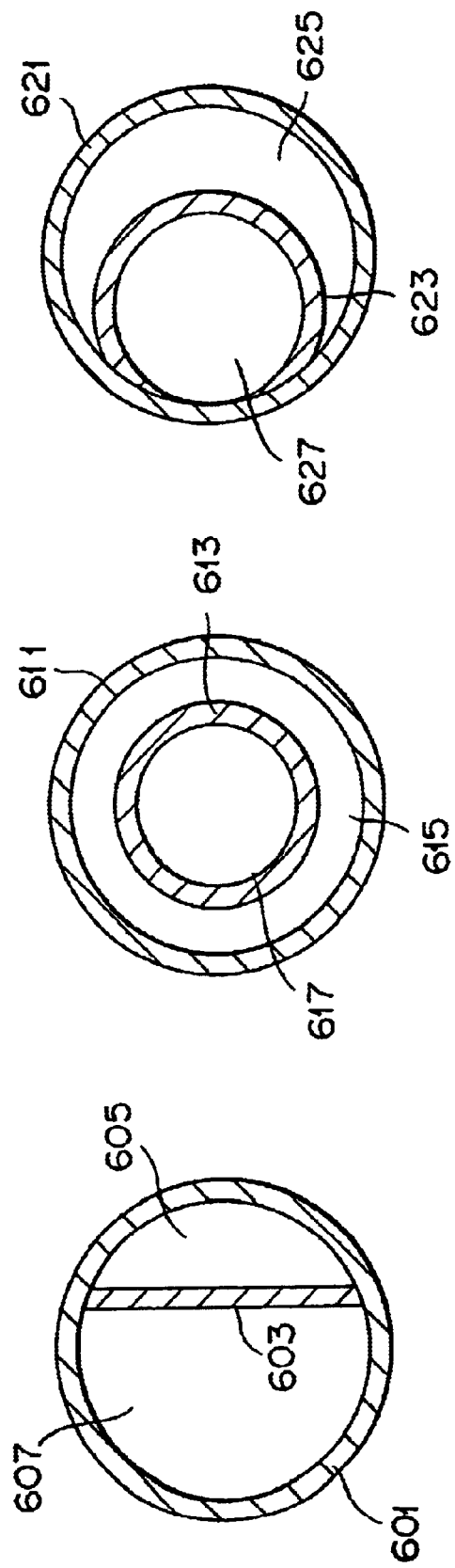

APPARATUS AND METHOD FOR PREPARATION AND SUPPLY OF POLYMERIZATION INHIBITOR

BACKGROUND OF THE INVENTION

1. Field of the Invention

This invention relates to a novel apparatus and method for the preparation and supply of a polymerization inhibitor. More particularly, the invention relates to a novel apparatus and method for the preparation and supply of a polymerization inhibitor, which comprises preparing a polymerization inhibitor solution by adjusting a polymerization inhibitor to an appropriate concentration with a concentration-adjusting liquid in a chemical plant handling an easily polymerizable compound, such as (meth)acrylic acid and (meth)acrylic acid ester, and continuing stable supply of the solution to an adequate step (device or path) of the chemical plant. The invention further relates to an apparatus and method for the preparation and supply of a polymerization inhibitor with a view to ensuring stable and safe preparation and supply of a polymerization inhibitor, preventing the chemical plant from inducing polymerization, and precluding the chemical plant from being clogged with a polymer. Especially, the invention relates to an apparatus and method for the preparation and supply of a polymerization inhibitor with the object of transforming a powdery polymerization inhibitor allowing neither easy handling nor easy adjustment of concentration into a solution containing the polymerization inhibitor at an adjusted concentration and adjusting the solution in advance so as to ensure effective manifestation of the effect of preventing polymerization.

2. Description of Related Art

The apparatus, which is now generally used for preparing and supplying a polymerization inhibitor batch-wise, is illustrated in FIG. 1.

The apparatus generally used for the preparation and supply of a polymerization inhibitor, as illustrated in FIG. 1, has a polymerization inhibitor preparing and supplying tank 151 which is provided with a propeller type stirrer 102 adapted to be driven by a motor (denoted by M in the diagram). A polymerization inhibitor input port 155 and a concentration-adjusting liquid input port 159 are disposed above the tank 151, and a polymerization inhibitor solution feed opening 163 is disposed below the tank 151. The polymerization inhibitor input port 155 is connected to a hopper 101 storing a polymerization inhibitor with a pipeline 153. The concentration-adjusting liquid input port 159 is connected to the interior of a chemical plant requiring to use an apparatus for the preparation and supply of such a polymerization inhibitor (as requiring to handle an easily polymerizable compound, for example) (hereinafter occasionally referred to simply as "chemical plant") or to a concentration-adjusting liquid tank disposed as part of the apparatus for the preparation and supply of the polymerization inhibitor (in the present specification occasionally referred to simply as "concentration-adjusting liquid tank") with a pipeline 157. The polymerization inhibitor solution feed opening (outlet) 163 is connected to a device or a path at an adequate step in a chemical plant requiring to use the apparatus for the preparation and supply of the polymerization initiator (in the present specification, occasionally referred to simply as "next step"; not shown in the diagram) with a pipeline 161. In the tank 151 mentioned above, a liquid level detector 117 is installed. A valve 107 is disposed on the path of the pipeline 153, a flow rate detector 109 and an on-off valve 108 are disposed on the path of the pipeline 157, and a pump 103, a flow rate detector 165, and a valve 166 are disposed on the path of the pipeline 161. Further, a control device 150 is installed as a control part intended to control the operating parts such as on-off valves in accordance with the outputs from detecting parts such as the liquid level detector and the flow rate detector. In the diagram, the control circuits are indicated with a broken line and the pipelines are indicated with a solid line.

FIG. 6 is a graph showing the time-course changes of the liquid level, the feed quantity of a polymerization inhibitor solution, and the concentration of the polymerization inhibitor in the tank which occur in the operation of the method for the preparation and supply by the use of the apparatus for the preparation and supply of a polymerization inhibitor illustrated in FIG. 1 and depicting in outline the on-off operations of the valves 107 and 108. The method for preparation and supply by the use of the apparatus for the preparation and supply of a polymerization inhibitor illustrated in FIG. 1 will be described below with reference to FIG. 6. The target product concentration of polymerization inhibitor SEQ (sequence control by the use of the control device 150) is started after the hopper 101 has been stored as required with the polymerization inhibitor. The concentration-adjusting liquid valve 108 is opened after the liquid level in the tank 151 indicated by the output from the liquid level detector has reached a region below the level for starting the adjustment (not lower than the liquid level for preventing the occurrence of a pump cavitation=5–20% of the whole volume; the liquid level of ① in FIG. 6). The concentration-adjusting liquid is supplied from the concentration-adjusting liquid tank through the pipeline 157 and the concentration-adjusting liquid input port 159 into the tank 151 till an amount necessary for the preparation (target value; the liquid level of ② in FIG. 6). This supply completes the target product concentration of polymerization inhibitor SEQ (resulting in the closure of the concentration-adjusting liquid valve 108). Then, the valve 107 is opened to start the supply of the polymerization inhibitor from the hopper 101 through the pipeline 153 and the polymerization inhibitor input port 155 to the tank 151 (the part of the operation from ③ to ④ in FIG. 6). Then, the operation of the stirrer 102 initiated by the instruction from the control device 150 is continued for about 10 minutes to complete the preparation of the polymerization initiator (the part of the operation from ④ to ⑤ in FIG. 6). The polymerization inhibitor-containing liquid produced in the tank 151 (in the present specification, occasionally referred to simply as "polymerization inhibitor solution") is continuously supplied to the next step through the polymerization inhibitor solution feed opening (outlet) 163 and further through the pipeline 161, with the flow rate of the liquid adjusted meanwhile at a substantially constant level as by means of the liquid transfer pump 103 on the pipeline 161 (refer to the graph of FIG. 6 showing the feed rate of the polymerization inhibitor solution).

By this method of preparation and supply, however, it has never been made possible to fix the polymerization inhibitor concentration in the tank during the supply of the concentration-adjusting liquid (the period between ① and ② in FIG. 6) (refer to the graph of FIG. 6 showing the polymerization inhibitor concentration in the tank). Thus, during the adjustment made for raising again the lowered liquid level by the addition of a polymerization inhibitor and a polymerization inhibitor adjusting liquid, the change in pressure attendant on the change in the liquid level or the like induces a variation in the feed rate to the next step or a variation in the liquid temperature. As a result, this method has been at a disadvantage in bringing only an insufficient effect in preventing the polymerization at the next step, by-producing a polymer, inducing the devices and the pipelines to sustain clogging, and degrading the quality of the product (refer to the graph of FIG. 6 showing the feed rate of a concentration-adjusting liquid). Also during the aforementioned adjustment by the addition of a polymerization inhibitor and a polymerization inhibitor adjusting liquid, the short-path of the concentration-adjusting liquid in the tank destabilizes the polymerization inhibitor concentration. The term "short-path" as used herein refers to the creation in the tank of a path through which the concentration-adjusting liquid reaches the polymerization inhibitor solution feed opening without being stirred in the tank together with the polymerization inhibitor. The method under discussion, therefore, is further at a disadvantage in manifesting no sufficient effect in preventing polymerization at the next step, suffering the devices and the pipelines (inclusive of the pipelines extending from the tank to the next step) to by-produce a polymer, inducing this polymer to adhere to and even occlude the devices, etc. and degrading the quality of a product. The plant operation, therefore, must be frequently suspended for the purpose of purging the devices, etc. of the defiling polymer. This frequent suspension is at a disadvantage in demanding tremendous time and labor, consequently degrading the operational efficiency of the preparation aimed at, and defying the object of weight preparation.

SUMMARY OF THE INVENTION

This invention, therefore, has for an object thereof the provision of an apparatus and method for the preparation and supply of a polymerization inhibitor, which accomplishes stable supply of a polymerization inhibitor solution adjusted to a prescribed concentration constantly, and encourages the prevention of a compound from being polymerized at the next step.

Another object of this invention consists in providing an apparatus and method for the preparation and supply of a polymerization inhibitor, which is enabled to encourage the prevention of a compound from being polymerized at the next step by stabilizing the flow rate (feed rate) of a polymerization inhibitor solution adjusted to prescribed concentration constantly.

We have pursued a diligent study repeatedly in search of an apparatus and method for the preparation and supply of a polymerization inhibitor with a view to fulfilling the objects mentioned above. We have been consequently ascertained that an apparatus for the preparation and supply of a polymerization inhibitor is capable of fulfilling the task imposed thereon when it is possessed of not less than two tanks and is provided in at least one of these tanks with a stirring device, a liquid level detector, a polymerization inhibitor input port, a concentration-adjusting liquid input port, and a polymerization inhibitor solution feed opening. This invention has been achieved on the basis of this knowledge.

The apparatus contemplated by this invention for the preparation and supply of a polymerization inhibitor ought to have not less than two tanks. The conventional method (refer to FIGS. 1 and 6) excels in economy in respect that a polymerization inhibitor solution is prepared from time to time in one tank and the polymerization inhibitor solution so prepared is supplied to the next step. This method, therefore, entails such problems as suffering the tank interior to give birth to a short-path for the polymerization inhibitor concentration-adjusting liquid (owing to the dispersion of the concentration of the polymerization inhibitor solution) and consequently giving no fixed concentration to the polymerization inhibitor solution to be supplied. The method fails to fix the feed rate because the change in the liquid level in the tank as the pressure in the tank varies and consequently the flow rate of the polymerization inhibitor solution to be supplied varies. The method further fails to fix the temperature of the polymerization inhibitor solution to be supplied because the intermittent injection of the polymerization inhibitor concentration-adjusting liquid into the tank as the solution temperature in the tank varies. Thus, this method brings no sufficient effect in precluding polymerization in the devices and the pipelines on the chemical plant, suffers the devices and the pipelines to incite occurrence of a polymer therein, consequently induces the polymer to clog the devices and the pipelines, and entails a huge economic loss in respect that the chemical plant requires to suspend the operation thereof wholly for the sake of purging the devices and the pipelines of the defiling polymer. It has also given rise to the problem on the chemical plant of degrading the quality of the product owing to the adulteration thereof with a defiling polymer. Based on this knowledge, we have ascertained that, by functionally combining not less than two tanks (refer to FIGS. 2–5 which will be specifically explained herein below), it is capable of repressing variations in the concentration of the polymerization inhibitor solution to be supplied, the feed rate of the solution, and the temperature of the solution and, consequently, to permit constantly stable supply of the polymerization inhibitor solution adjusted to a prescribed concentration at a stated flow rate and at a stated temperature and encourage prevention of polymerization at the next step.

In this invention, it is capable of, by functionally combining not less than two tanks (refer to FIGS. 2–5 which will be specifically explained herein below), repressing variations in the concentration of the polymerization inhibitor solution to be supplied, the feed rate of the solution, and the temperature of the solution. This invention, consequently, permits the polymerization inhibitor solution adjusted to a prescribed concentration to be stably supplied at a stated flow rate and at a stated temperature constantly and encourages the preclusion of polymerization in the devices, etc. in the chemical plant.

BRIEF DESCRIPTION OF THE DRAWINGS

The accompanying drawing incorporated in and forming a part of the specification, illustrates several aspects of the present invention, and together with the description serve to explain the principles of the invention. In the drawings:

FIG. 2 is an explanatory diagram representing one example of the apparatus to be used in the method of this invention for continuous preparation and supply of a polymerization inhibitor aimed at;

FIG. 6 is a graph showing changes in the liquid level in a tank in the apparatus of FIG. 1, 6A representing the time-course change in the liquid level in the tank (referred to as "LLT"), 6B representing the time-course change in the flow rate of the solution containing a polymerization inhibitor (referred to as "FRSPI"), 6C representing the time-course change in the concentration of a polymerization inhibitor in the tank (referred to as "CPI"), 6D representing the time-course and corresponding events, 6E representing the time-course change in the position of valve 107, and 6F representing the time-course change in the position of valve 108;

FIG. 8 is a graph showing changes in the liquid level in a tank in the apparatus of FIG. 3, 8A representing the time-course change in the LLT, 8B representing the time-course change in the FRSPI, 8C representing the time-course change in the CPI, 8D representing an operating step, 8E representing an on-off status of a certain valve, and 8F representing an on-off status of another valve;

FIG. 9 is a graph showing changes in the liquid level in a tank in the apparatus of FIG. 4, 9A representing the time-course change in the LLT, 9B representing the time-course change in the FRSPI, 9C representing the time-course change in the CPI, 9D representing an operating step, and 9E–9H each representing an on-off status of a varying valve;

FIG. 10 is a graph showing changes in the liquid level in a tank in the apparatus of FIG. 5, 10A representing the time-course change in the LLT, 10B representing the time-course change in the FRSPI, 10C representing the time-course change in the CPI, 10D representing an operating step, and 10E–10I each representing an on-off status of a varying valve; and FIG. 11A is a schematic cross section showing the appearance in a section perpendicular to the axial direction of two tanks formed by dividing a cylindrical tank possessed of an upper bottom and a lower bottom with a flat partition plate laid in the axial direction, FIG. 11B is a schematic cross section showing the appearance in a section perpendicular to the axial direction of two tanks formed by dividing a cylindrical tank possessed of an upper bottom and a lower bottom with an inner tube disposed as a partition plate parallel to the axial direction so as to give rise to a concentrical double-tube tank, and FIG. 11C is a schematic cross section showing the appearance in a section perpendicular to the axial direction of two tanks formed by dividing a cylindrical tank possessed of an upper bottom and a lower bottom with an inner tube disposed as a partition plate eccentrically therein and parallel to the axial direction.

DESCRIPTION OF THE PREFERRED EMBODIMENTS

Figure 1:
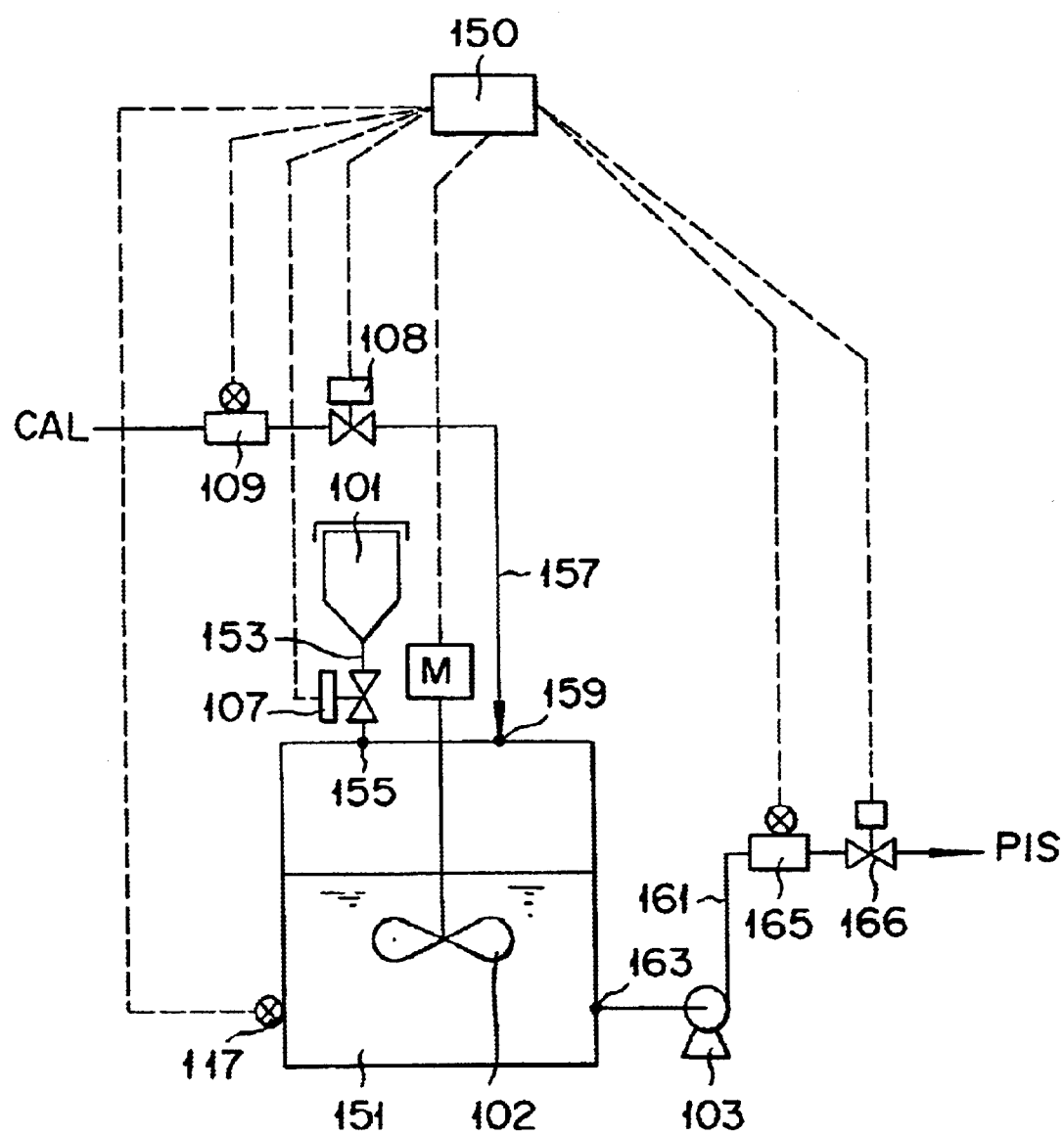
FIG. 1 is an explanatory diagram of an apparatus to be used in the conventional method for preparing and supplying a polymerization inhibitor aimed at batch-wise.

The apparatus of this invention for the preparation and supply of a polymerization inhibitor is characterized by having not less than two tanks and providing in at least one of the tanks with a stirring device, a liquid level detector, a polymerization inhibitor input port, a concentration-adjusting liquid (referred to as "CAL") input port, and a polymerization inhibitor solution (referred to as "PIS") feed opening.

The apparatus of this invention for the preparation and supply of a polymerization inhibitor is directed toward preparing and supplying a polymerization inhibitor in a chemical plant requiring to handle an easily polymerizable compound such as (meth)acrylic acid or a (meth)acrylic acid ester with a view to preventing the polymerizable compound from being polymerized. It is particularly aimed at preparing from a powdery polymerization inhibitor allowing neither easy handling nor easy adjustment of concentration a PIS adjusted to an appropriate concentration with an adequate CAL. By continuing stable supply of the solution thus prepared to a proper step in the chemical plant (device or path), it is capable of using the solution for the purpose of effectively preventing the polymerizable compound in the process of preparation from succumbing to unwelcome polymerization. This invention nevertheless is not limited to this particular application but can be applied effectively to all the devices (plants) that require preventing a compound being handled in the process of preparation from yielding to polymerization.

For a start, the polymerizable compound which can be handled by the apparatus of this invention for the preparation and supply of a polymerization inhibitor is not particularly restricted but preferred to be an easily polymerizable compound. Such easily polymerizable compounds are carboxylic acids such as acrylic acid, methacrylic acid, fumaric acid, and maleic acid which have an unsaturated double bond and the esters thereof. Acrylic esters may include methyl acrylate, ethyl acrylate, butyl acrylate, 2-ethylhexyl acrylate, hydroxyethyl acrylate, and hydroxypropyl acrylate. Then, methacrylic esters may include methyl methacrylate, ethyl methacrylate, butyl methacrylate, 2-ethylhexyl methacrylate, 2-hydroxyethyl methacrylate, and hydroxypropyl methacrylate.

Then, the polymerization inhibitor that can be handled by the apparatus of this invention for the preparation and supply of a polymerization inhibitor is not particularly restricted but may be selected from among the known polymerization inhibitors, in particular powdery polymerization inhibitors. The polymerization inhibitor which is intended to be used at a chemical plant producing (meth)acrylic acid or (meth) acrylic ester may include at least one member selected from the group consisting of phenothiazine, benzoquinone, hydroquinone, methoxy hydroquinone, hydroquinone monomethyl ether, cresol, t-butyl catechol, diphenyl amine, methylene blue, phenol, tri-p-nitrophenyl methyl, 2,4-dimethyl-6-tertiary butyl alcohol, cupferron, and picric acid; at least one member selected from the group consisting of copper salt compounds such as copper dimethyl dithiocarbamate, copper diethyl dithiocarbamate, copper dibutyl dithiocarbamate, and copper salicylate, and manganese salt compounds such as manganese acetate; p-phenylene diamines such as p-phenylene diamine; N-oxyl compounds such as 4-hydroxy-2,2,6,6-tetramethyl piperidinoxyl; ureas such as urea; and thioureas such as thiourea. These polymerization inhibitors may be used either singly or in combination of two or more member. Among other polymerization inhibitors enumerated above, phenothiazine, hydroquinone, and hydroquinone monomethyl ether prove particularly advantageous in respect that they excel in solubility in a CAL, manifest very efficiently an effect in preventing a gaseous easily polymerizable compound in devices and pipelines in the plant from being polymerized, and repress the formation of a high-molecular weight substance (polymer).

In the case of use of powdery polymerization inhibitor, a prill form is preferably used. Usually, a powdery polymerization inhibitor is used in the form of flake but exhibits several shapes or sizes, which is difficult to be dissolved in a solvent and liable to form a bridge. The shape of the prill form is generally in the form of sphere, the particle size of which depends on apparatuses and conditions to be used, but may be in the range of 300 to 5000 μm, and preferably in the range of 500 to 2000 μm. If the size is less than 300 μm, the prill form is liable to form bridges or to flush. On the other hand, if the size exceeds 5000 μm, the prill form is liable to form bridges in the input portion and not to be dissolved. Further, it is difficult to use a power supplying apparatus.

The expression "CAL which can be handled by the apparatus of this invention for the preparation and supply of a polymerization inhibitor" as used herein means a liquid (solution) which is used for adjusting the polymerization inhibitor to a prescribed concentration as mentioned above. Particularly when the polymerization inhibitor is in a powdery form, the liquid (solution) is preferred to be capable of dissolving the polymerization inhibitor at a high speed and adjusting it quickly to the prescribed concentration. The CAL is not particularly restricted but may be selected, depending on the kind of a polymerization inhibitor, so as to suit it optimally.

As concrete examples of the CAL, water; carboxylic acids and esters such as (meth)acrylic acid, methyl (meth)acrylate, ethyl (meth)acrylate, butyl (meth)acrylate, 2-ethylhexyl (meth)acrylate, hydroxyethyl (meth)acrylate, and hydroxypropyl (meth)acrylate which have an unsaturated double bond; various alcohols such as methanol, ethanol, n-butanol, isobutanol, t-butanol, 1-pentanol, 2-pentanol, 3-pentanol, cyclopentanol, 1-hexanol, 2-hexanol, 3-hexnol, cyclohexanol, 1-heptanol, 2-heptanol, 3-heptanol, 1-octanol, isooctanol, 2-ethyl hexanol, isononyl alcohol, and lauryl alcohol; and benzene, toluene, diphenyl ether, xylene, cyclohexane, dioxane, pentane, hexane, heptane, chlorobenzene, isopropyl ether, dimethyl chlorohexane, ethyl cyclohexane, ethyl benzene, anisole, diethyl ether, isobutyl ether, dibutyl ether, dimethyl ketone, diisobutyl ketone, diisopropyl ketone, methyl isobutyl ketone, methyl-n-propyl ketone, and methyl-t-butyl ketone may be cited. These CALs may be used either singly or in combination of two or more members. It is particularly preferable to use a CAL containing at least one compound selected from the group consisting of acrylic acid, methacrylic acid, and esters thereof.

Then, the concentration of the PIS which is prepared by the apparatus of this invention for the preparation and supply of a polymerization inhibitor has only to be adjusted to a range such that the PIS will be enabled to manifest efficiently the effect of preventing a compound in the system from being polymerized at the next step and will exert no adverse effect on the product obtained at the chemical plant. It nevertheless ought to be properly decided to suit the kind of product to be manufactured at the plant, the kinds of polymerization inhibitor and CAL to be used, and the degrees of their solubility and cannot be uniquely specified. The quantity of the polymerization inhibitor to be used is generally in the range of 0.01–100 parts by weight and preferably in the range of 0.1–10 parts by weight, based on 100 parts by weight of the CAL. If the quantity is less than 0.01 part by weight based on 100 parts by weight of the CAL, the quantity of the CAL to be used will increase and on the chemical plant will enlarge. This increase in the quantity of the CAL, for example, will make it necessary to adjust the quantity of the heat to be added to the product in the process of manufacture (particularly at the step of the relevant reaction) and, when the CAL is to be separated and recovered, will add to the cost of the recovery and result in boosting the cost of preparation. Further, since the polymerization inhibitor has a low concentration, it will not be capable of manifesting the effect of preventing polymerization. Conversely, if the quantity of the polymerization inhibitor exceeds 100 parts by weight based on 100 parts by weight of the concentration-adjusting solution, the quantity of the CAL will decrease on the contrary. This decrease of the quantity of the CAL will be at a disadvantage in not easily enabling the PIS, when applied as by spraying to the gasified easily polymerizable compound in the chemical plant so as to act on the compound, to produce the action uniformly and fully satisfactorily, in attaining effective repression of the formation of a polymer only with difficulty, and possibly suffering the quantity of the polymerization inhibitor to surpass the concentration of the polymerization inhibitor contained to the upper limit of solubility in the product of the chemical plant.

Now, the essential factors for the construction of the apparatus of this invention for the preparation and supply of a polymerization inhibitor will be described below.

In the first place, the apparatus of this invention for the preparation and supply of a polymerization inhibitor has not less than two tanks. This necessity has been confirmed by the discovery that by functionally combining two or more tanks (refer to FIGS. 2–5 which will be specifically described herein below). It is possible to repress variations in the concentration of the PIS to be supplied, the feed rate of the solution thereof, and the temperature of the solution, enable the PIS adjusted to a prescribed concentration to be stably supplied constantly, and promote the prevention of polymerization at the next step.

Figure 2:
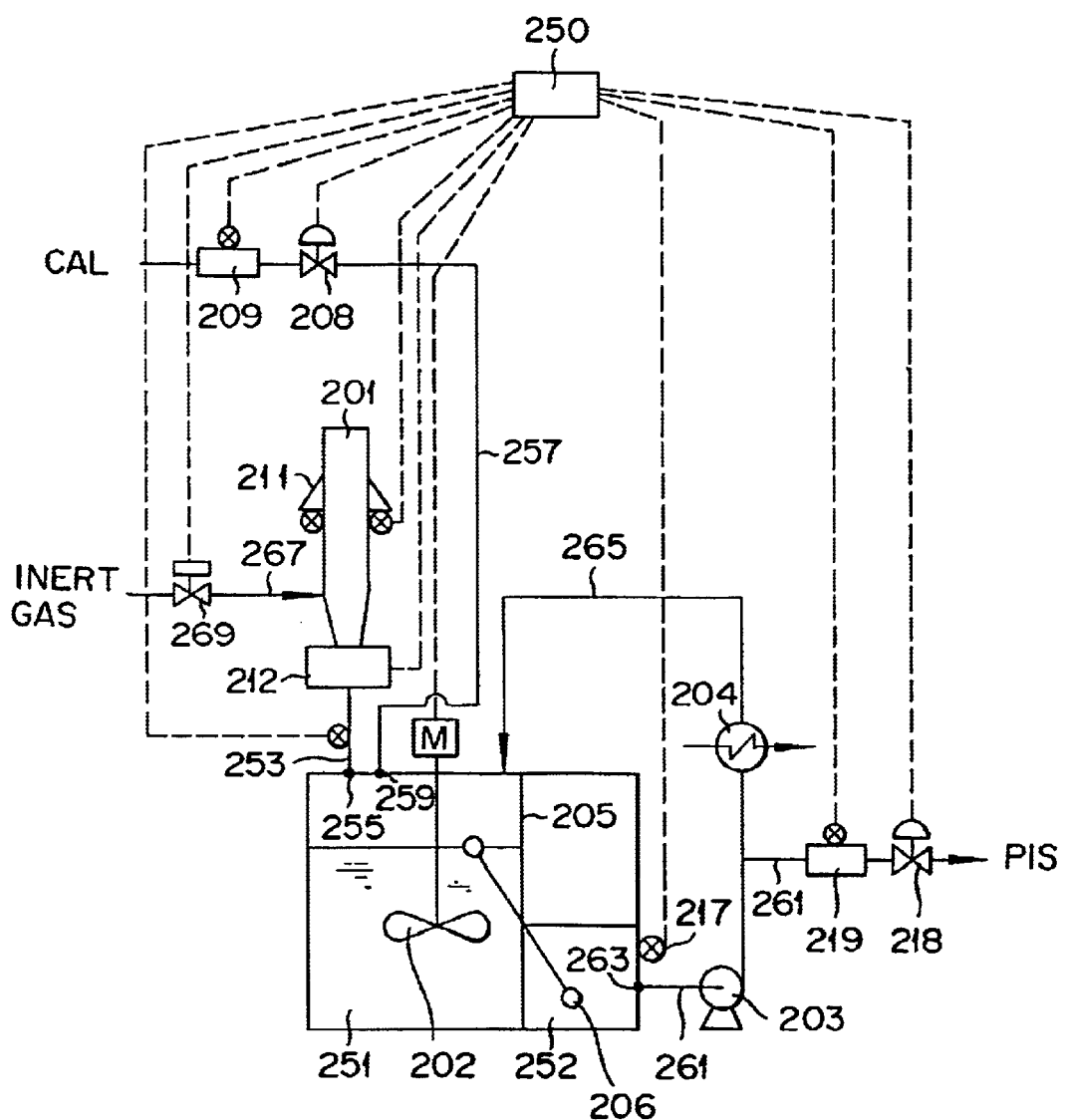
Figure 3:
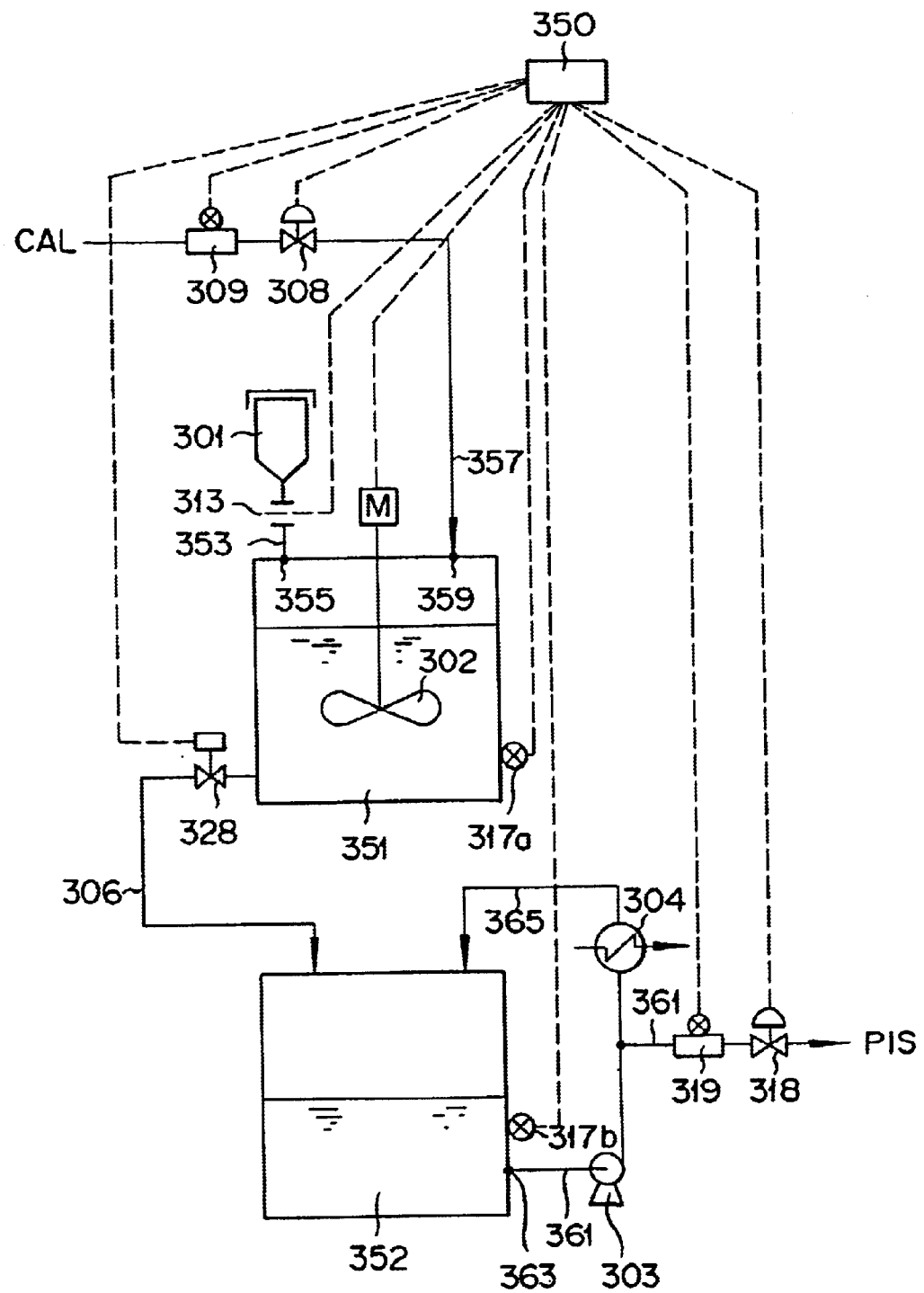
FIG. 3 is an explanatory diagram illustrating one example of the apparatus to be used in the method of this invention for preparing and supplying a polymerization inhibitor aimed at batch-wise.
Figure 4:
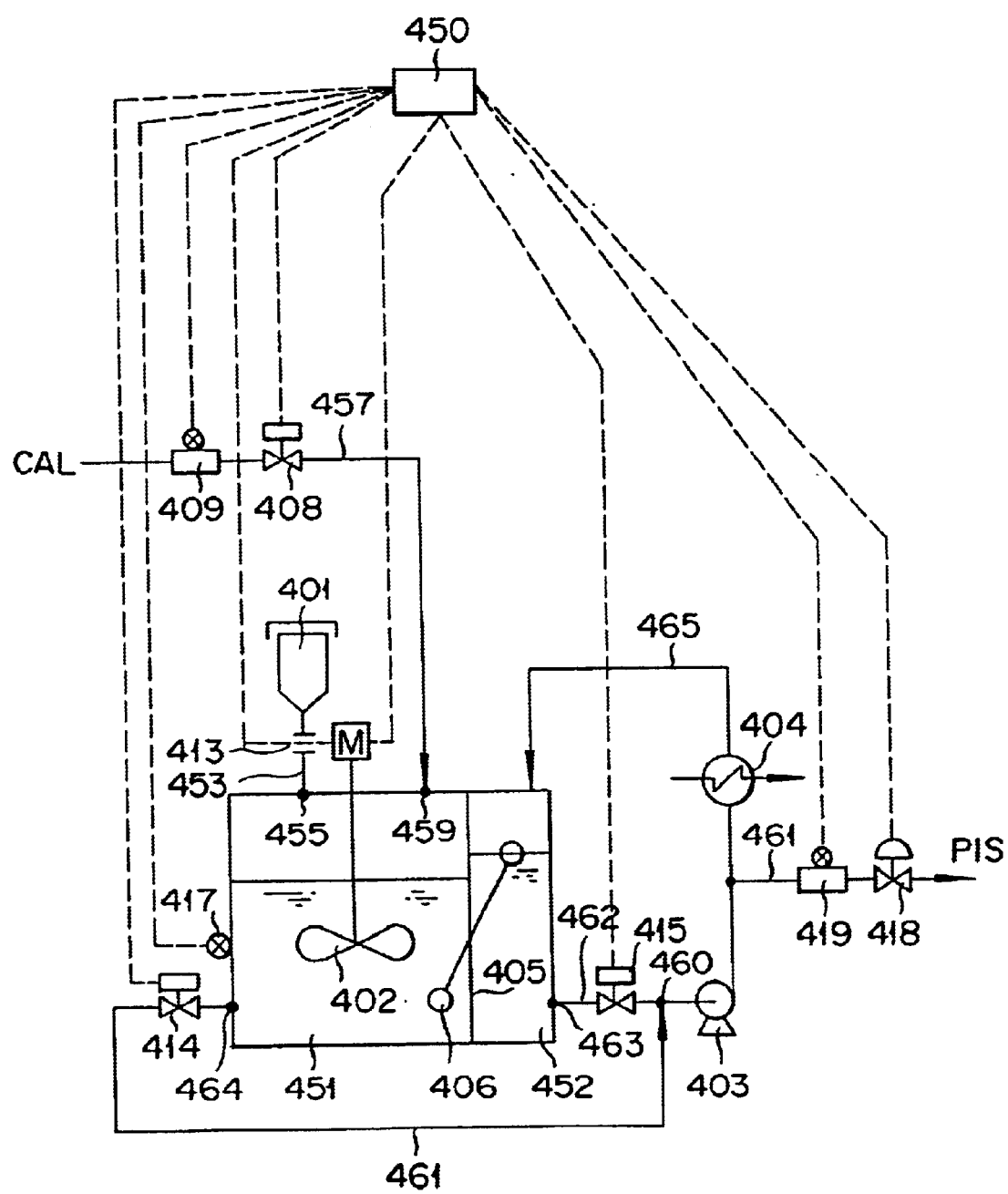
FIG. 4 is an explanatory diagram illustrating another example of the apparatus to be used in the method of this invention for preparing and supplying a polymerization inhibitor aimed at batch-wise.
Figure 5:
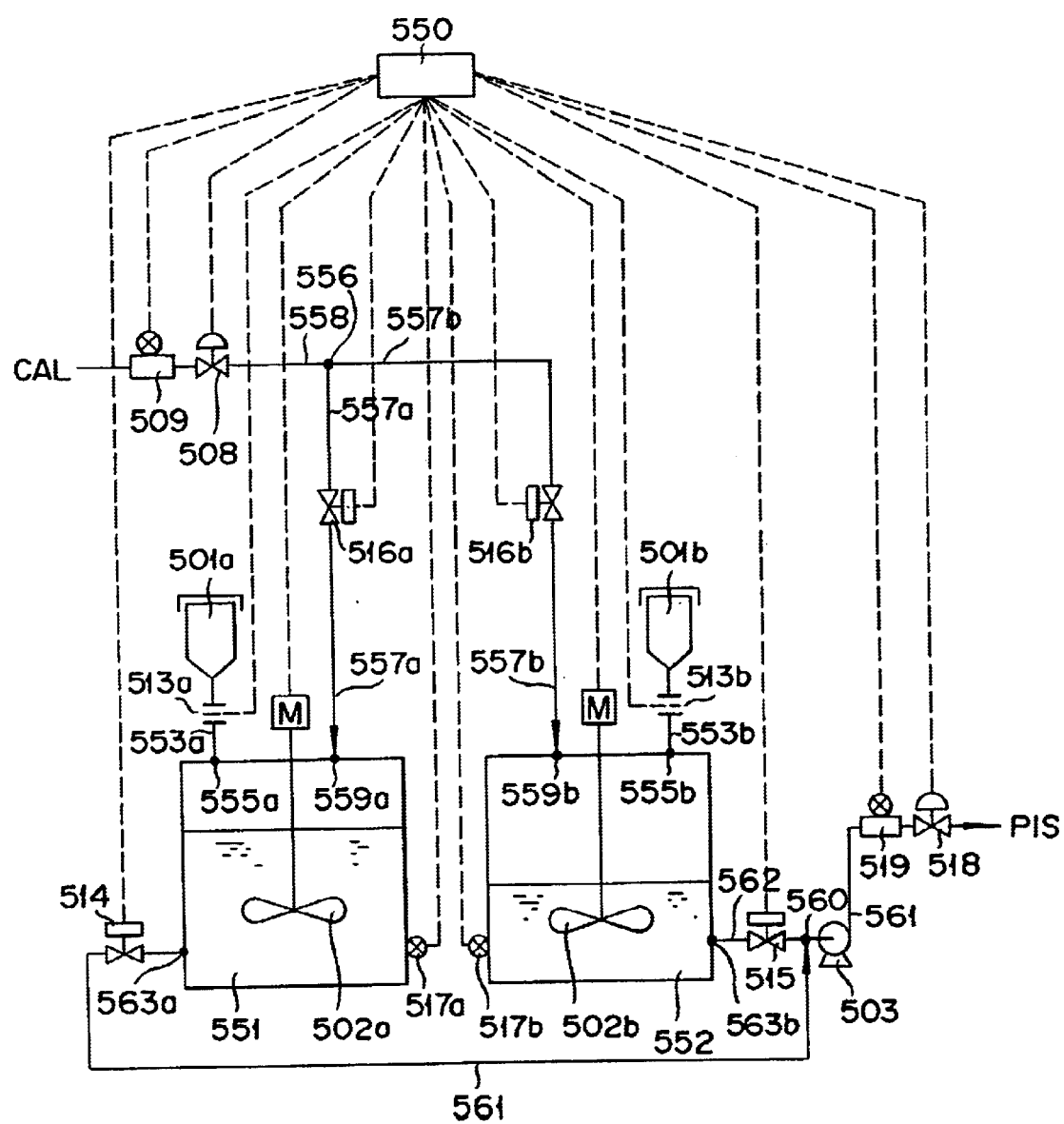
FIG. 5 is an explanatory diagram illustrating still another example of the apparatus to be used in the method of this invention for preparing and supplying a polymerization inhibitor aimed at batch-wise.
Figure 7A:
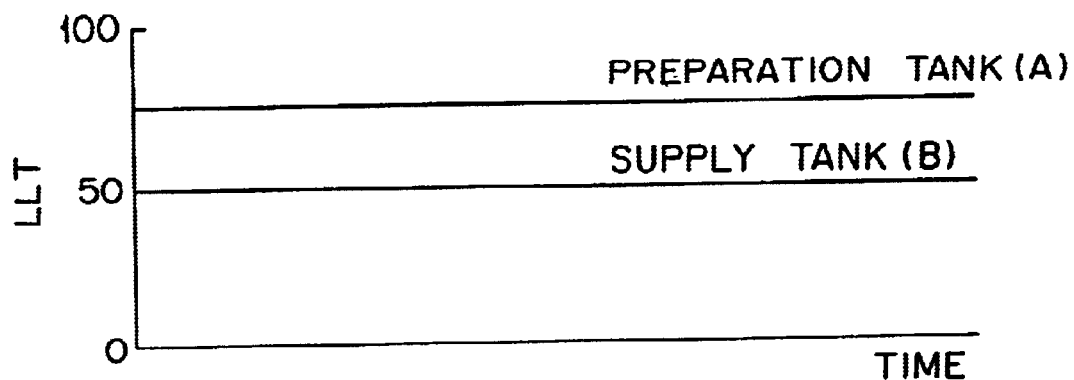
FIG. 7 is a graph showing changes in the liquid level in a tank in the apparatus of FIG. 2, 7A representing the time-course change in the LLT, 7B representing the time-course change in the FRSPI, and 7C representing the time-course change in the CPI.
Figure 7B:
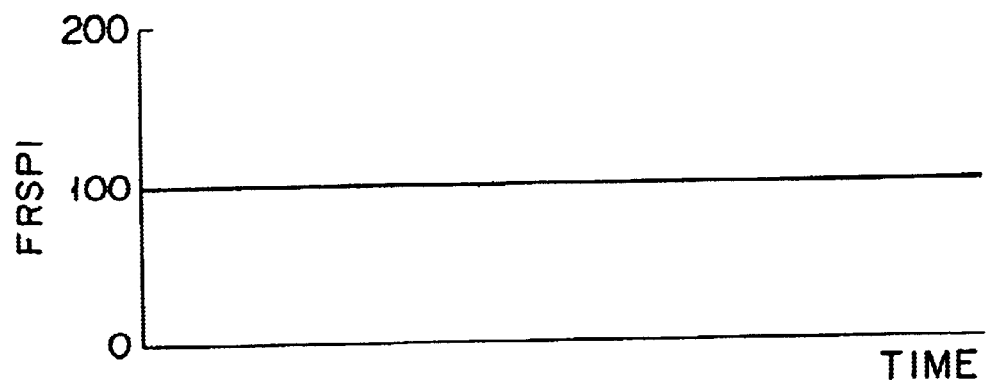
Figure 7C:
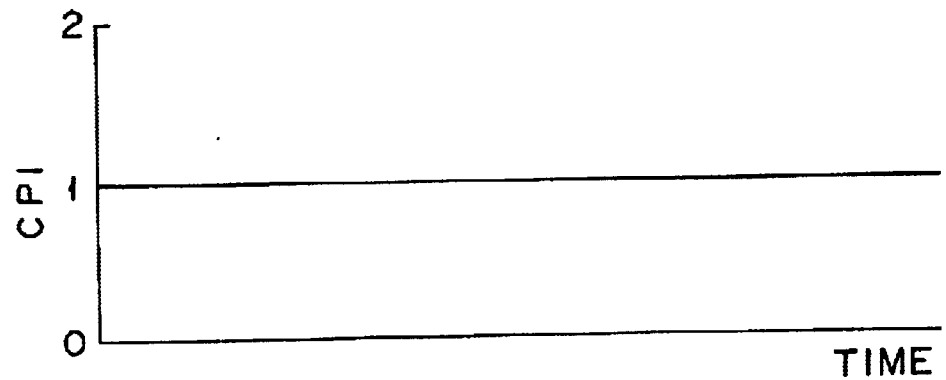

In this invention, therefore, it suffices to have not less than two tanks combined functionally and organically so as to manifest technically feasible actions and effects as mentioned above. As regards the manner of this combination, a plurality of tanks may be serially connected as illustrated in FIGS. 2–4. To be specific, at least one of them is used as a tank (A) for preparation and at least another of them as a tank (B) for supply and they are so adapted that even when the tank (A) suffers the concentration of the solution and the temperature of the solution to vary, the tank (B) may be constantly in the optimal condition without being affected by the variation (with the result that the excellent action and effect will be manifested as illustrated in FIGS. 7–9). Otherwise, pluralities of tanks are disposed parallel (independently) as illustrated in FIG. 5. To be specific, the individual tanks are adapted to perform both preparation and supply and the master tank for supply to the next step is switched sequentially to the optimized one of these tanks (with the result that the excellent action and effect will be manifested as illustrated in FIG. 10). These tanks may be further combined suitably. The combination of the tanks is not particularly restricted to any of these examples.

The tank is a container that retains a solution including a polymerization inhibitor (at a prescribed concentration). It is not particularly restricted on account of shape or material but only required to be capable of retaining the solution. As regards the shape, the tank with a stirring device is preferred to be in the shape of a cylinder having an upper bottom and a lower bottom, for example, so as to permit smooth stirring of the solution contained therein. Then, as regards the material, when the polymerization inhibitor or the CAL has a metal corroding property, the inner wall part of the tank may be formed of a material capable of resisting the metal corroding property or the tank may be lined with a material capable of resisting the metal corroding property. The inner volume of the tank cannot be uniquely specified because it is variable with the number of tanks to be installed, the scale of preparation of the next step which utilizes a solution containing the produced polymerization inhibitor, the kind of an easily polymerizable compound to be handled, and the like.

As concerns the expression "not less than two tanks," not less than two tanks may be disposed or one tank that is divided with a partition plate into at least two chambers may be disposed. Optionally, these at least two tanks and the one tank furnished with divided chambers may be suitably combined. Further, even in the case of using a partition plate, it is permissible to form a tank 607 furnished with a tank 605 and a stirring device by causing a flat plate 603 to be disposed, as a partition plate, in a cylindrical tank 601 with an upper and lower bottoms parallel to the axial direction thereof so as to divide the tank in a section perpendicular to the axial direction into two parts, as illustrated in FIG. 11A, for example. As tanks with a stirring device, it is permissible to form two tanks, i.e. a tank 615 and a tank 617 provided with a stirring device, by dividing one tank 611 into two parts with an inner tube 613, as a partition plate, in a manner such as to form a concentric double pipe, as illustrated in FIG. 11B or C, with a view to ensuring smooth stirring and mixing. It is otherwise permissible to form two tanks, i.e. a tank 625 and a tank 627 with a stirring device, by dividing one tank 612 into two parts with a tubular member 623 disposed eccentrically therein as a partition plate. These measures are commendable because they allow owing to the use of a partition plate to form a miniaturized cylindrical tank with an upper bottom and a lower bottom in a cylindrical tank provided with an upper bottom and a lower bottom and enabled to facilitate stirring and mixing. It is alternatively permissible to form two vertically divided cylindrical tanks each furnished with an upper bottom and a lower bottom by disposing a disc-like partition plate perpendicularly to the axial direction within a cylindrical tank furnished with an upper bottom and a lower bottom.

The partition plate mentioned above is not required to adhere to this designation. It is not particularly restricted in respect of shape and material but only required to permit fulfillment of the objects of this invention. As respects the material, the partition plate may be formed of the same material as the tank proper or may be formed of a different material. As pertains to the shape, the partition plate is not to be in the shape of a flat plate, as illustrated in FIG. 11B or C, but may be in the shape of a corrugated plate.

Two or more tanks, as occasion demands, may be used as serially connected with intervening pipelines (inclusive of overflow lines) as shown in the embodiment which will be described specifically herein below (refer to embodiments 1–3 illustrated in FIGS. 2–4). Owing to this arrangement, the series of tanks can be functionally connected and enabled individually to fulfill efficiently the functions (roles) allocated thereto by the operation ranging from preparation through supply of a PIS. Even when the tanks on the preparation side incur problems such as the formation of a short-path for an adjusting liquid, the variation in liquid level, and the variation in pressure, therefore, these problems are alleviated till the operation reaches the final tank on the supply side. Thus, from the final tank on the supply side, the PIS adjusted to a prescribed concentration can be stably supplied at a stated feed rate and at a stated temperature. Incidentally, the use of an overflow line, if any, will bring such an advantage as saving the space required for the installation of the tanks and the pipelines. Optionally, part of the PIS may be circulated as adjusted in temperature to the interiors of the tanks. This circulation brings the advantage of enabling the effects to be manifested more conspicuously. The plurality of tanks may be laid in the so-called parallel connection instead of being serially connected (refer to Embodiment 4 illustrated in FIG. 5). Also by this arrangement, at the time that the PISs prepared in the individual tanks are stabilized and each adjusted to uniform concentration and temperature, these tanks are sequentially switched to allow stable supply of the solution to the next step. Thus, outstanding operations and functions can be similarly manifested. It is further permissible to have such serial connection and parallel connection combined suitably.

The apparatus of this invention for the preparation and supply of a polymerization inhibitor ought to require the aforementioned tank to be furnished with a stirring device. The term "stirring device" as used herein means a machine which is capable of dissolving, stirring, and mixing the polymerization inhibitor. Various known-stirring machines such as propeller type-stirring machines of the type driven with a motor and line mixers are cited. In this invention, it suffices to install this stirring device in a tank which stands in need of this stirring device according to the relevant embodiment. Specifically, when the plurality of tanks are serially connected as illustrated in FIGS. 2–4, it suffices to install the stirring device in the tank which is used for the preparation of the PIS. When two or more tanks are disposed in a parallel connection as illustrated in FIG. 5, it is necessary to install the stirring device in each of the tanks so that the PIS may be prepared in all the tanks. The position for installing the stirring device in the tank and the number of such stirring devices may be properly decided, depending on the inner volume and the shape of the tank, so as to allow necessary stirring and mixing to proceed quickly and more preferably to allow no easy occurrence of a short-path for the CAL. Incidentally, the operation of the stirring device is preferably controlled so as to synchronize with the operation of other operating parts (such as valves).

The apparatus of this invention for the preparation and supply of the polymerization inhibitor requires the aforementioned tank to be furnished with a liquid level detector. The term "liquid level detector" as used herein refers to a measuring instrument for detecting the liquid level of a fluid contained in the tank. As concrete examples of the liquid level indicator, differential pressure type level gauges such as diaphragm type level gauge, float type level gauge, displacement type level gauge, capacitance type level gauge, and gauge glass type level meter may be cited. For this invention, it suffices to install the pertinent liquid level detector in the tank which requires the detector in accordance with the embodiment. Preferably, the liquid level detector is installed in each of the tanks as illustrated in FIGS. 2–5 so that the liquid levels in all the tanks may be constantly monitored. It is provided, however, that when a plurality of tanks are connected by using an overflow line as illustrated in FIG. 2, the liquid level detector is installed only in the tank on the outlet side of the overflow line.

The tank mentioned above is further provided with a polymerization inhibitor input port, a CAL input port, and a PIS feed opening.

The polymerization inhibitor input port and the CAL input port may be properly disposed in the tank which stands in need of the tank in accordance with the embodiment. When two or more tanks are serially connected, it suffices to dispose these input ports in the tank which is used for preparing the PIS (refer to FIGS. 2–4). When two or more tanks are disposed in a parallel connection, it is necessary to have these input ports disposed on each of the tanks (refer to FIG. 5).

By the same token, it suffices to dispose the PIS feed opening in the tank which stands in need of the tank in accordance with the embodiment. When two or more tanks are serially connected, it suffices to dispose the PIS feed opening on the side of the tank which is used for supplying the PIS to the next step (refer to FIGS. 2–4). When two or more tanks are disposed in parallel connection, it suffices to have the PIS feed opening disposed in each of the tanks (refer to FIG. 5). Incidentally, in the present specification, when the plurality of tanks are serially connected and adapted to transfer the PIS to the separate connected tanks, the PIS output ports disposed on the tanks for preparation may be alternatively used as PIS outlets and discriminated from the PIS feed openings (refer to FIG. 3).

Then, the polymerization inhibitor input port mentioned above is connected, as described above, to a hopper through the medium of a pipeline. When the polymerization inhibitor is a solid substance, the position for installing the polymerization inhibitor input port, therefore, is preferred to be higher than the maximum liquid level in the tank, generally falling in the upper face part of the tank, as illustrated in FIGS. 2–5. Incidentally, when the polymerization inhibitor is a liquid substance, since it can be introduced by the use of a pump, for example, the position for the installation is not particularly defined. When the relation of the positions of such input ports and feed openings (outlets) satisfies a fixed condition, these input ports and feed openings can serve as effective means to preclude occurrence of a short-path for the CAL in the tank. To be specific, when a polymerization inhibitor input port and a CAL input port provided both in one tank are caused to be disposed as separated from a PIS feed opening (outlet) in the same tank, this arrangement possibly serves as an effective means to prevent the occurrence of a short-path of the CAL mentioned above.

The size and shape of the polymerization inhibitor input port are particularly restricted but only required to be capable of passing the incoming polymerization inhibitor at a required feed rate within a prescribed duration. When the polymerization inhibitor to be used is a solid substance, the size (diameter) and the shape of the input port are preferred to be decided by taking into due consideration the possibility that the polymerization inhibitor in the pipeline and the hopper will be humidified with the vapor from the tank side and consequently suffered to form a bridge of powder, for example.

Further, the position for installation, the size, and the shape of the CAL input port do not need to be particularly restricted. The fact that the CAL input port is disposed at a position separated from the PIS feed opening (outlet) disposed in the same tank may possibly constitute itself an effective means to prevent the formation of a short-path for the concentration-adjusting solution in the tank. Then, the size and the shape of the CAL input port are not particularly restricted because they do not pose the powder-bridging problem.

To the CAL input port, a CAL tank, for example, may be connected through the medium of a pipeline. This CAL tank may be installed as one requirement for the construction of the apparatus of this invention. Otherwise, the solvent tank which is provided on the side of the chemical plant adopting the apparatus of this invention may be diverted as the CAL tank. Specifically, the CAL to be used in this invention is preferred to be such that it avoids affecting the compound in the devices in the chemical plant but rather acts promptly on the PIS and on the solution and the vapor (gas) containing the easily polymerizable compound on the chemical plant. The CAL to be used is preferred to be identical with the solvent component in the solution containing the easily polymerizable compound used on the chemical plant or in the vapor component. This is because the use of this CAL is advantageous for the sake of eventually separating, purifying, and recycling the solvent. This invention, therefore, has not chosen the CAL tank as an essential requirement for the construction thereof.

The apparatus of this invention is used for the purpose of stably supplying the PIS prepared to a prescribed concentration constantly to the next step. The method for preparing the PIS is not particularly restricted. The preparation may be effected either continuously or batch-wise, which ever may suit the occasion better. The term "continuous method" as used herein refers to a method which continues the procedure of supplying a polymerization inhibitor and a CAL into a tank, stirring and mixing them in a stirring device, and preparing (forming) a PIS adjusted to a prescribed concentration and consequently effects stable supply of this PIS constantly to the next step. The term "batch type" as used herein refers to a method which, by supplying a CAL into a tank continuously or batch-wise, introducing a polymerization inhibitor into the same time, stirring and mixing them by the use of a stirring device, and preparing (forming) a PIS adjusted to a prescribed concentration batch-wise, effects stable supply of this PIS to the next step.

This invention further prefers the apparatus to be furnished with a hopper. The term "hopper" as used herein refers to a container for storing a polymerization inhibitor. The hopper so incorporated in the apparatus is aimed at stably supplying the polymerization inhibitor in an adequate quantity at an adequate time into the tank. Incidentally, the shape and the material of the hopper are not particularly restricted.

The hopper mentioned above is responsible for supplying the polymerization inhibitor to the tank. When two or more tanks mentioned above are seriously connected, for example, the hopper mentioned above has only to be connected to the polymerization inhibitor input port disposed in that of these tank which is used for the preparation of the PIS through the medium of a pipeline, for example (refer to FIGS. 2–4). When the tanks are disposed in a parallel pattern, the hopper mentioned above has to be connected to the polymerization inhibitor input port disposed in each of the tanks through the medium of a pipeline (refer to FIG. 5). The hopper has to be connected to the tanks which are needed in accordance with the embodiment. Thus, the number of hoppers varies with the embodiment. When two or more tanks are arranged in a parallel connection, it is permissible to install hoppers in a number commensurate with the number of tanks. Otherwise, the individual tanks may be connected to one hopper through the medium of as many pipelines. When two or more tanks are used as serially connected, the hopper has to be connected only to the tank to be used for the preparation of the PIS.

When this invention elects to use a powdery polymerization inhibitor and prepare a PIS continuously, it is preferred to use a means for continuing supply of the polymerization inhibitor in a fixed quantity into the tank (refer to FIG. 2). This means for continuous fixed-quantity supply is disposed, for example, on a polymerization inhibitor inlet line which is interposed between the outlet of the hopper and the polymerization inhibitor input port of the tank. As a concrete example of the means for continuous fixed-quantity supply, a powder-supplying device that is capable of continuously supplying the polymerization inhibitor in a fixed quantity to the tank may be cited, though not exclusively. The powder-supplying device is generally composed of a stirring vane, a supplying disc, a scraper (a raking plate), a reduction gear, a motor, a casing, a chute, etc. The feed rate is adjusted and controlled by the aperture of the scraper and the rotational frequency of the supplying disc. Further, this powder-supplying device is preferred to keep the degree of accuracy of supply unaffected by a change in the inner pressure of the hopper in the upper part. As the powder-supplying device, "Smooth Auto Feeder" available from Taisei Kogyo K.K. in Japan may be utilized.

When the means for continuous fixed-quantity supply mentioned above is used, an on-off valve cannot be disposed on the polymerization inhibitor inlet line that intervenes between the outlet of the hopper and the polymerization inhibitor input port of the tank. This adversity, therefore, entails the possibility that the vapor from the tank will infiltrate the line and the hopper, the condensate of steam will wet the polymerization inhibitor, and the wet polymerization inhibitor will adhere to the inner walls of the pipelines and the hopper and give rise to a powder bridge therein. Thus, the means for continuous fixed-quantity supply is preferably furnished with a means for precluding the wetting of the polymerization inhibitor, the adhesion of powder, the formation of a powder bridge, and the generation of steam from the tank. As the precluding means, (1) a vibration generating means which is capable of exerting vibration, particularly lateral vibration, to the hopper and the polymerization inhibitor inlet line, (2) a means for introducing an inert gas to the hopper and the polymerization inhibitor inlet line, (3) a means for supplying a heat source to the polymerization inhibitor line, and (4) a means for exchanging heat for the interior or the exterior of the tank, for example, may be provided, though not exclusively.

As concrete examples of the vibration generating means mentioned in (1), an air knocker, a hammering, and a vibrator may be cited. Owing to the exertion of vibration, particularly lateral vibration, with the vibration generating means, the formation of a powder bridge inside the hopper can be effectively obstructed by means of the vibrating stress. This means is also at an advantage in inducing quick disintegration of the powder bridge already formed. This vibration generating means can manifest the effect thereof fully satisfactorily when it is operated intermittently, if not continuously operated. For the sake of the generation of vibration, the powder-supplying device to be adopted may be provided in part of the feed rate adjusting and control mechanism thereof with a compression vibration device or a hammering device. Apart from the powder-supplying device, the compression vibration device or the hammering device may be disposed in the hopper or the polymerization inhibitor inlet line. When the device is disposed on the polymerization inhibitor inlet line, the work involved demands due care lest it should affect the adjustment and control of the feed rate by the powder-supplying device.

As a concrete example of the means for introducing an inert gas mentioned in (2) above, a system which is formed by connecting the lower terminal part of a hopper and an inert gas tank through the medium of a pipeline for the introduction of an inert gas and disposing a valve or a pump, when necessary, on the pipeline may be cited, though not exclusively. Similarly, as a concrete example of the means for introducing an inert gas to the pipeline for the introduction of the polymerization inhibitor, a system which is formed by connecting an inert gas tank to the pipeline for the introduction of the polymerization inhibitor through the medium of a pipeline for the introduction of an inert gas and disposing a valve or a pump on the pipeline for the introduction of the inert gas may be cited, though not exclusively. Since this means for the introduction of the inert gas is capable of repressing the infiltration of the steam from the tank, such adverse phenomena as the wetting of the polymerization inhibitor in the hopper and the pipeline for the introduction of the polymerization inhibitor, the adhesion of powder, and the formation of powder bridge can be precluded. Further, since the powder can be introduced at a fixed rate into the tank without any loss and the powder so introduced does not entrain a solid matter such as the bridge possibly scraped by the powder falling into the tank, the subsequent stirring and mixing can be completed within a stated duration. When the powder in a dried state is handled as when the polymerization inhibitor in the hopper is replenished from an external source, for example, it has the possibility of triggering an accident of dust explosion. When the interior of the hopper is kept filled with an inert gas, however, this measure is at an advantage in contributing effectively to the prevention of the dust explosion. The introduction of the inert gas does not need to be continued constantly but may be carried out intermittently within the range in which the possible infiltration of the steam from the tank may be obstructed. Particularly from the viewpoint of economy, the amount of the inert gas to be used is preferably repressed. The above inert gas is not particularly restricted but may be selected from a molecular oxygen-containing gas, nitrogen gas, argon gas, or helium gas.

This invention permits the hopper to be provided with a load cell as a means for detecting the quantity of the polymerization inhibitor to be introduced into the hopper (refer to FIG. 2). The term "load cell" used herein refers to an instrument for detecting the load of the polymerization inhibitor. This instrument is known in various types such as pneumatic, hydraulic, and electric. Since the powder allows no easy measurement of the flow rate thereof, the load cell is utilized in the apparatus for continuous preparation and supply of the polymerization inhibitor when an automatic control system for the input rate of the polymerization inhibitor is constructed by the use of a powder-supplying device.

The means for supplying a heat source to the polymerization inhibitor inlet line mentioned in (3) above ought not be particularly restricted. As concrete examples of this means, a heat transfer coil and a heater disposed on the outer periphery of the polymerization inhibitor inlet line and outer cladding devices such as a trace and a jacket which are capable of transferring a thermal medium and are disposed on the outer periphery may be cited. The heat source supplying means mentioned above is enabled, by keeping the temperature of the inner wall of the polymerization inhibitor inlet line at a level higher than the temperature at which the steam from the tank is condensed, to prevent the steam from being cooled in the pipeline and caused to condense on the inner wall thereof. As a result, the problem that the polymerization inhibitor passing the interior of the polymerization inhibitor inlet line adheres to the steam condensate can be solved.

As concrete examples of the means for exchanging heat for the interior or the exterior of the tank mentioned in (4) above, heat exchangers of the shell-and-tube type, coil type, and spiral type which are installed inside or outside the tank may be cited. The means for heat exchange mentioned above is enabled, by utilizing heat exchange in lowering the temperature of the fluid (mainly the CAL) in the tank than the temperature at which the fluid is vaporized and heightening the concentration of the fluid than the concentration of the polymerization inhibitor at the upper limit of the solubility thereof, to repress the generation itself of steam from the tank and preclude the precipitation of the polymerization inhibitor.

When the means for continuous fixed-quantity supply mentioned above is not used, it is preferable to have a valve for introducing the polymerization inhibitor disposed on the polymerization inhibitor inlet line which intervenes between the hopper exit and the polymerization inhibitor input port of the tank. The valve thus disposed can be utilized as a means to permit injection of the polymerization inhibitor in a needed quality at a time of need and shut down the flow of steam from the tank to the interior of the hopper unless the time for introduction. Though the valve of this description is not particularly restricted, it is preferred not to entail appreciable collection of gas from the viewpoint of not only preventing polymerization but also precluding the adhesion of powder to the valve interior from impairing the on-off action thereof or dispersing the quantity of the polymerization inhibitor to be introduced. As concrete examples of the valve incurring no appreciable collection of gas, a ball valve, a disc damper type valve, a cut gate valve, and a lock damper type valve may be cited. Among other conceivable valves, the slide gate valve is used particularly advantageously from the viewpoint of entailing no appreciable collection of liquid, exhibiting an excellent sealing property, and permitting easy adjustment of the feed rate of the powder by the on-off operation.

Even when the means for continuous fixed-quantity supply is not used, the steam from the tank side infiltrates the polymerization inhibitor input line extending from the tank through the valve and the steam from the valve further infiltrates the polymerization inhibitor input line on the hopper side and the interior of the hopper when the valve is opened. As a result, the condensate of the steam possibly wets the polymerization inhibitor, adheres to the inner walls of the polymerization inhibitor inlet line and the hopper, and gives birth to a powder bridge therein. Thus, the provision of a means for preventing the wetting of the polymerization inhibitor, the adhesion of powder, the occurrence of a powder bridge, and the generation of steam from the tank proves favorable. It is permissible to provide (1) the means for generation of vibration, (2) the means for introduction of an inert gas, (3) the means for supply of a heat source, and (4) the means for heat exchange mentioned above as occasion demands.

This invention prefers the CAL inlet line to be provided on the upstream side thereof with a means possessed of a flow rate detector and a valve and adapted to control the polymerization inhibitor concentration uniformly (refer to FIGS. 2–5 and 7–10). Since this provision permits the CAL to be introduced into the tank requiring the supply thereof in a needed quantity at a time of need depending on the relevant embodiment, it is capable of preparing the PIS adjusted to a prescribed concentration without reference to the embodiment and supplying this solution stably to the next step. Thus, the occurrence of a polymer in the devices and the pipelines on the chemical plant can be effectively prevented and the duration which proceeds till the devices and the pipelines require cleaning can be extended widely. The operation of the chemical plant, therefore, excels in economy because the whole chemical plant can be operated stably for along time. It is further at an advantage in not suffering the product on the chemical plant to be deteriorated by adulteration with an unwelcome polymer and allowing the product of high quality to be obtained inexpensively. The term "flow rate detector" as used herein means a measuring instrument for detecting the flow rate of a liquid. As concrete examples of the flow rate detector, volumetric flow meters such as an oval flow meter; differential pressure type flow meters such as an orifice flow meter and a venturi flow meter; a sonic flow meter, a float type flow meter, a volute type flow meter, a mass flow meter, an electromagnetic flow meter, and an area type flow meter may be cited. The valve involved herein does not need to be particularly restricted. As concrete examples of the valve, a diaphragm valve, a ball valve, a gate valve, a globe valve, a glow valve, a saunders valve, a butterfly valve, and an angle valve may be cited. Among other valves enumerated above, the diaphragm valve, globe valve, saunders valve, and butterfly valve which are capable of adjusting the flow rate arbitrarily prove particularly advantageous. The means for uniformly controlling the polymerization inhibitor concentration is not particularly restricted. As concrete examples of this means, control devices such as a flow rate adjusting meter and a flow rate indicator and metering pumps may be cited. The control means mentioned above may be what is utilized as a control device for actuating the valve (operating part) mentioned above based on the output of a flow rate detector (detecting part) on the upstream side of the CAL line. It may be further what utilizes a control device (part thereof) for actuating various operating parts of devices based on the outputs of various detecting parts used in the whole apparatus.

This invention allows the tank to be provided with a means for controlling the liquid level of the tank by introducing the CAL into the tank and allows the tank to be provided with a means for controlling the polymerization inhibitor concentration at a fixed level by introducing the polymerization inhibitor into the tank (refer to FIGS. 2–5 and 7–10). Inconsequence of the provision of these means, the variation of pressure due to a sudden variation of the liquid level can be repressed, the feed rate can be retained at a fixed level by repressing the variation of the flow rate of the PIS, and the fully satisfactory effect of preventing polymerization can be obtained and the occurrence of a polymer can be prevented at the next step. As a result, the operation of the chemical plant excels in economy because the whole chemical plant can be operated stably for a long time and it is further at an advantage in not suffering the product on the chemical plant to be deteriorated by adulteration with an unwelcome polymer and allowing the product of high quality to be obtained inexpensively. Incidentally, the term "tank liquid level" as used herein refers to the liquid level in each of the tanks as illustrated in FIG. 7 in the case of the embodiment illustrated in FIG. 2, for example, or refers to the total of liquid levels in not less than two tanks as illustrated in FIG. 8 and FIG. 10 in the case of the embodiment illustrated in FIG. 3 and FIG. 5. Since the liquid level varies with the embodiment, it ought to be properly decided depending on the relevant embodiment. As concrete examples of the means for controlling the liquid level of the tank by introducing the CAL into the tank (A) for the preparation, control devices such as a liquid level adjusting meter and a liquid level indicator and devices for securing a fixed volume of liquid such as an overflow may be cited. As concrete examples of the means for controlling the polymerization inhibitor concentration at a fixed level by introducing a polymerization inhibitor into the tank (A) for the preparation, control devices such as a weight indicator, on-line analyzing devices, and stirring devices such as an agitator may be cited. The apparatus may be provided with a control device which performs a processing operation on the numerical data from the various detectors in the devices and controls the operations of various operating parts based on the outputs of the processing operation.

This invention prefers the apparatus to be provided with a means for supplying a PIS to the next step. By the provision of this means, it is capable of controlling the feed rate of the PIS supplied to the next step constantly at a fixed level without inducing any variation in the flow rate of the solution. As concrete examples of the means for supplying the PIS to the next step, control devices such as a flow rate adjusting meter and a flow meter indicator and metering pumps may be cited.

Now, the embodiment of this invention will be described below with reference to the drawings annexed hereto.

One typical embodiment (the first embodiment) of the apparatus contemplated by this invention for continuous preparation and supply of a polymerization inhibitor is schematically illustrated in FIG. 2. In the present embodiment, two tanks are serially connected. One of the tanks is used exclusively for preparing a PIS and the other tank is used for continuing stable supply of the PIS brought from the one tank mentioned above at an adjusted concentration to the next step while constantly maintaining the liquid level of the solution at a fixed level. As a result, the apparatus as a whole is enabled to effect continuous fixed-quantity supply of the PIS adjusted to a prescribed concentration stably and safely.

In the first embodiment of the apparatus of this invention for the preparation and supply of a polymerization inhibitor, one tank is divided with a partition plate 205 into two tanks as illustrated in FIG. 2. One of them is a tank (A) 251 for preparing the polymerization inhibitor and the other is a tank (B) 252 for storing the PIS prepared at a fixed concentration in the tank (A) for the preparation and continuously supplying the solution stably at a fixed flow rate to the next step. While one tank is divided with a partition plate into two tanks herein, the present embodiment may construct the same apparatus by using two independent tanks. Further, the present embodiment allows the number of tanks to be increased without departure from the spirit of the present embodiment and permits the tanks to be used as serially disposed.

As a means for transferring the solution from the tank (A) 251 for the preparation to the tank (B) 252 for the supply, a pipeline (overflow line) 206 sloped to allow the flow of the solution from the preparation tank (A) 251 to the supply tank (B) 252 is internally connected through the medium of the partition plate 205. Owing to the solution transferring means mentioned above, the portion of the PIS of adjusted concentration which surpasses the fixed liquid level in the preparation tank (A) 251 overflows the upper terminal opening of the pipeline 206 on the preparation tank (A) 251 and flows down toward the supply tank (B) 252 by dint of the difference of height. While the pipeline (overflow line) 206 is internally connected herein, the present embodiment allows the pipeline (overflow line) 206 to be externally connected. The internal connection is at an advantage in allowing the solution to be transferred without being affected by the ambient temperature. The pipeline, however, must be disposed with due care lest it should affect the flow of the solution while the solution is stirred.

The supply tank (B) 252 mentioned above is provided with a liquid level detector 217 for detecting the liquid level in the tank. This liquid level detector 217 is connected to a control device 250.

Then, the preparation tank (A) 251 is provided in the upper part thereof with a polymerization inhibitor input port 255. For the purpose of introducing the polymerization inhibitor into the preparation tank (A) 251, a hopper 201 is connected to the polymerization inhibitor input port 255 through the medium of a pipeline 253.

As a means for detecting the quantity of the polymerization inhibitor introduced into the hopper 201 mentioned above, the hopper 201 is provided with a load cell (load detector) 211. This load cell 211 is connected to the control device 250.

Further, as a means for effecting continuous fixed-quantity supply of the polymerization inhibitor into the tank, the pipeline 253 intervening between the outlet of the hopper 201 mentioned above and the preparation tank (A) 251 is provided on the line thereof with a powder-supplying device 212. The powder-supplying device 212 mentioned above is connected to the control device 250. The provision of the means for continuous fixed-quantity supply of the polymerization inhibitor results in enabling the polymerization inhibitor to be continuously supplied in a fixed quantity into the preparation tank (A) 251 and contributing greatly to the retention of the liquid level, the feed rate of the PIS, and the concentration of the polymerization inhibitor in the tank at respectively fixed levels constantly as shown in FIG. 7. Here, the case in which the polymerization inhibitor to be handled happens to be a powdery substance is exemplified by depicting the use of the powder-supplying device 212. When the polymerization inhibitor is a liquid substance, the pipeline 253 may be provided on the line thereof with a flow rate detector and an on-off valve as means for control the flow rate and these means may be connected to the control device 250. As concrete examples of the device which can be used for continuous fixed-quantity supply, a rotary feeder and a table feeder may be cited In the present embodiment, as means for preventing the wetting of a polymerization inhibitor, the adhesion of powder, the occurrence of a powder bridge, and the generation of steam from the tank, the apparatus is provided with (1) a vibration generating means capable of exerting vibration (particularly lateral vibration) on the hopper and (2) a means for introducing an inert gas into the hopper, for example. The means so provided need not be limited to the examples cited above.

As the vibration generation means mentioned in (1) above, the hopper 201 is provided therein with a hammering device (not shown in the diagram).

As the means for introducing an inert gas into the hopper as mentioned in (2) above, the hopper 201 is provided in the lower part thereof with a pipeline 267 for introducing an inert gas into the hopper 201 and this pipeline 267 is connected to an inert gas tank (not shown). The pipe line 267 is provided on the line thereof with an on-off valve 269 and a pressure pump (not shown). The on-off valve 269 is further connected to the control means 250.

The preparation tank (A) 251 is provided in the upper part thereof with a CAL input port 259. For the purpose of supplying the CAL into the preparation tank (A) 251, a CAL tank (not shown) is connected to the CAL input port 259 through the medium of a pipeline 257.

As a means for controlling the flow rate of the CAL into the preparation tank (A) 251, the pipeline 257 mentioned above is provided on the line thereof with a flow rate detector 209 and an on-off valve 208, which are connected to the control device 250.

The preparation tank (A) 251 is further provided with a propeller type-stirring device 202 as a stirring and mixing means for continuously preparing a PIS of an adjusted concentration by stirring and mixing a CAL and a polymerization inhibitor which are supplied into the preparation tank (A) 251. The stirring device 202 (a driving part for a motor, for example) mentioned above is connected to the control device 250. The present embodiment, when necessary, allows the supply tank (B) 252 to be provided with a stirring and mixing means.

The supply tank (B) 252 is provided in the lower part thereof with a PIS feed opening (exit) 263 which is capable of extracting the PIS from the supply tank (B) 252. This feed opening is connected to the next step through the medium of a pipeline 261.

As a means for stably transferring the PIS extracted from the supply tank (B) 252, the pipeline 261 is provided on the line thereof with a liquid transfer pump 203. The liquid transfer pump 203 which is a liquid transfer mean herein is only required to be capable of continuously extracting the solution in a fixed quantity. The present embodiment allows the liquid transfer pump 203 to be connected to the control device 250 in such a manner that the flow rate of the PIS to be forwarded to the circulation line allowing adjustment of the liquid temperature by heat exchange may be adjusted by the liquid transfer pump 203 in accordance with the change of liquid temperature in the preparation tank (A) 251.

As a control means for stably supplying the PIS extracted from the supply tank (B) 252 constantly at a fixed flow rate to the next step without resorting to the variation in the quantity of the solution to be discharged, the pipeline 261 to the posterior of the liquid transfer pump 203 is provided on the line thereof with a flow rate detector 219 and an on-off valve 218. The detector and the valve are connected to the control device 250.

Further, as a means for adjusting the temperature of the PIS flowing to the next step, a pipeline 265 branched from the pipeline 261 intervening between the liquid transfer pump 203 and the flow rate detector 219 mentioned above is connected to the upper part of the preparation tank (A) 251. The pipeline 265 is provided on the line thereof with a heat exchanger 204. This liquid temperature adjusting means is installed for the purpose of circulating into the preparation tank (A) 252 part of the PIS brought in by the liquid transfer pump 203 and meanwhile adjusting the temperature of the circulating PIS by means of heat exchange and retaining the temperature of the liquid in the tank and consequently the temperature of the PIS directed toward the next step at a fixed level. Though the provision of the heat exchanger for the adjustment of the liquid temperature has been described, the means for this adjustment is not particularly limited to the heat exchanger.

In the diagram, the circuits of the control system are indicated with a dotted line and the lines of pipelines with a solid line. In the apparatus illustrated herein, the control device 250 is adapted to perform a processing operation based on the numerical data from the detectors of various component parts of the apparatus and control the motions of the component parts of the apparatus. In the present embodiment, the detectors of the various component parts and the operating parts of the valves may be individually connected to liquid level indicators, flow rate indicators, liquid level adjusting meters, and flow rate adjusting meters so as to control the motions of the various component parts individually.

Now, the method for preparation and supply implemented by using the apparatus for the preparation and supply of a polymerization inhibitor illustrated in FIG. 2 will be described below with reference to the drawings annexed hereto.

FIG. 7 is a graph showing in outline the time-course changes of the liquid level, the feed rate of a PIS, and the concentration of a polymerization inhibitor in the tank which are produced by the method of preparation and supply implemented by using the apparatus for the preparation and supply of a polymerization inhibitor illustrated in FIG. 2.

As illustrated in FIG. 2 and FIG. 7, the CAL from the CAL tank is continuously introduced through the pipeline 257 into the preparation tank (A) 251 via a CAL input port 259 while the supply tank (B) 252 is controlled so as to retain the liquid therein at a fixed level. The term "control" as used herein means a procedure which comprises causing the control device 250 to perform a processing operation based on the numerical data mainly from the liquid level detector 217 and the flow rate detectors 209, 219, actuating a valve 208 based on the result of the processing operation, and control the quantity of the CAL introduced into the preparation tank (A) 251.

Parallel to the preceding operation, the polymerization inhibitor is continuously introduced through the pipeline 253 into the preparation tank (A) 251 via the polymerization inhibitor input port 255 while the preparation tank (A) 251 is controlled so as to retain the liquid therein at a fixed level. The term "control" as used herein means a procedure which comprises causing the control device 250 to perform a processing operation based on the numerical data from the load cell 211 and the flow rate detectors 209 and 219, actuating the powder-supplying device 212 based on the result of the processing operation, and controlling the quantity of the polymerization inhibitor introduced from the powder-supplying device 212.

In the preparation tank (A) 251, the PIS adjusted to a uniform concentration is produced by continuously operating the stirring device 202 disposed in the tank thereby stirring and mixing the polymerization inhibitor and the CAL being continuously brought therein.

Part of the PIS so produced is constantly transferred from the preparation tank (A) 251 to the supply tank (B) 252 through the pipeline 206 by dint of the difference of height.

The PIS which has been transferred to the supply tank (B) 252 is extracted through the PIS feed opening (outlet) 263 by the pump 203 and constantly transferred through the pipeline 261 to the apparatus of the next step while the feed rate of the PIS being transferred to the next step is controlled to remain at a fixed level. The term "control" as used herein means a procedure which comprises causing the control device 250 to perform a processing operation based on the numerical data mainly from the flow rate detectors 209 and 219, actuating the valve 218 based on the result of the processing operation, and controlling the quantity of the PIS discharged from the supply tank (B) 252 and transferred to the next step.

Part of the PIS extracted through the PIS feed opening (outlet) 263 is circulated through the pipeline 265 into the supply tank (A) 251. In the meanwhile, the temperature of the PIS is adjusted by the heat exchanger 204 disposed on the line of the pipeline 265 to an adequate level for preventing the solution from forming a polymer at the next step. Incidentally, in the present embodiment, the relevant flow rates and the computations of concentration are automatically controlled.

The consequence is the manifestation of a truly outstanding operation and effect of allowing the liquid level of the supply tank (B) 252, the feed rate of the PIS, and the concentration of the polymerization inhibitor in the supply tank (B) 252 to be invariably retained at respectively fixed levels as shown in FIG. 7.

A schematic diagram of the apparatus representing a typical embodiment (the second embodiment) of the apparatus contemplated by this invention for batch preparation and supply of a polymerization inhibitor is shown in FIG. 3. In the present embodiment, two tanks are used as disposed in a serial connection. By using one of the tanks exclusively for preparing a PIS and the other tank for storing the PIS brought in at an adjusted concentration from the one tank and stably supplying the solution to the next step, it is possible to construct an apparatus which is capable of preparing the PIS batch-wise and enabling the PIS of an adjusted concentration to be continuously supplied at a fixed rate stably and safely.

In the second embodiment of the apparatus of this invention for the preparation and supply of a polymerization inhibitor, the apparatus is possessed of two tanks disposed vertically as illustrated in FIG. 3. The upper one of them is a preparation tank (A) 351 for the preparation of a PIS and the lower one is a supply tank (B) 352 for storing the PIS produced at a fixed concentration in the preparation tank (A) 351 and continuously supplying the solution stably at a fixed flow rate to the next step. Though the use of two independent tanks has been described, the present embodiment may construct the same apparatus by dividing one tank into two vertically separate tanks with a partition plate. The number of tanks may be increased without departure from the spirit of the present embodiment.

As a means for transferring the liquid from the preparation tank (A) 351 to the supply tank (B) 352, a pipeline 306 is disposed to interconnect the lower part of the preparation tank (A) 351 and the upper part of the supply tank (B) 352. Further the pipeline 306 is provided on the line thereof with an on-off valve 328. Further, this on-off valve 328 is connected to a control device 350. This liquid transferring means which is not provided with a liquid transfer pump is so adapted that the PIS of an adjusted concentration produced in the preparation tank (A) 351 will be caused by the switching of the valve disposed on the line of the pipeline 306 to flow down intermittently through the pipeline 306 toward the supply tank (B) 352 by dint of the difference in height. Though the disposition of two tanks in the vertical direction has been described, the present embodiment allows these tanks to be disposed in a parallel connection (as arranged laterally). Since the difference of height cannot be harnessed for the purpose of the transfer of the liquid in this case, the transfer of the liquid may be attained by providing the pipeline 306 on the line thereof with a liquid transfer pump and actuating this pump while the valve is opened.

The preparation tank (A) 351 mentioned above is furnished with a liquid level detector 317a for the purpose of detecting the liquid level in the tank. By the same token, the supply tank (B) 352 mentioned above is furnished with a liquid level detector 317b for the purpose of detecting the liquid level in the tank. Further, these detectors are connected to the control device 350.

The preparation tank (A) 351 is provided in the upper part thereof with a polymerization inhibitor input port 355. Further, for the purpose of supplying the polymerization inhibitor into the preparation tank (A) 351, a hopper 301 is connected to the polymerization inhibitor input port 355 through the medium of a pipeline 353.

As a means for controlling the quantity of the polymerization inhibitor to be introduced into the preparation tank (A) 351 mentioned above, the pipeline 353 is provided on the line thereof with a gate valve 313. Further, this gate valve 313 is connected to the control device 350.

Incidentally, the present embodiment may contemplate incorporating therein a means for generating vibration and a means for introducing an inert gas to the hopper as the same means for preventing the wetting of the polymerization inhibitor with the condensate of steam, the adhesion of powder, the formation of a powder bridge, and the generation of steam from the tank that were used in the first embodiment mentioned above.

Further, the preparation tank (A) 351 is provided in the upper part thereof with a CAL input port 359. For the purpose of supplying the CAL to the preparation tank (A) 351, a CAL tank (not shown) is connected to the CAL input port 359 through the medium of a pipeline 357.

As a means for controlling the flow rate of the CAL to the preparation tank (A) 351, the pipeline 357 mentioned above is provided on the line thereof with a flow rate detector 309 and an on-off valve 308. These are further connected to the control device 350.

The preparation tank (A) 351 is provided with a propeller type-stirring device 302 as a stirring and mixing means for stirring and mixing the CAL and the polymerization inhibitor supplied intermittently into the preparation tank (A) 351 batch-wise and stably preparing a PIS of adjusted concentration. Further, the stirring device 302 (the driving part for a motor, for example) is connected to the control device 350. Incidentally, the present embodiment may optionally allow the supply tank (B) 352 to be also furnished with a mixing means.

The supply tank (B) 352 is provided in the lower part thereof with a PIS feed opening (outlet) 363 with the object of enabling the PIS to be withdrawn from the supply tank (B) 352. This feed opening 363 is connected to the next step through the medium of a pipeline 361.

As a liquid transfer means for stably transferring the PIS extracted from the supply tank (B) 352, the pipeline 361 is provided on the line thereof with a liquid transfer pump 303. The liquid transfer pump 303 which is a liquid transfer means herein is not particularly restricted but only required to be capable of continuously withdrawing the liquid in a fixed quantity.

As a control means for stably supplying the PIS withdrawn from the supply tank (B) 352 constantly at a fixed flow rate to the next step without relying on the variation in the quantity of the solution to be discharged, the pipeline 361 to the posterior of the liquid transfer pump 303 is provided on the line thereof with a flow rate detector 319 and an on-off valve 318. These are further connected to the control device 350.

Further, as a means for adjusting the temperature of the PIS advanced to the apparatus of the next step, a pipeline 365 branched from the pipeline 361 intervening between the liquid transfer pump 303 and the flow rate detector 319 mentioned above is connected to the upper part of the supply tank (B) 352. The pipeline 365 is provided on the line thereof with a heat exchanger 304. This liquid temperature adjusting means is disposed for the purpose of enabling part of the PIS brought in by the liquid transfer pump 303 to be circulated into the supply tank (B) 352, meanwhile adjusting the temperature of the circulating PIS by means of heat exchange, and retaining the liquid temperature in the tank and consequently the temperature of the PIS advancing to the next step at respectively adequate levels. Though the provision of the heat exchanger for the adjustment of the liquid temperature has been described, the means for the liquid temperature adjustment ought not be particularly restricted. The supply tank (B) 352 maybe provided externally or internally with a liquid temperature adjusting means.

In the diagram, the circuits of the control system are indicated with a broken line and the lines of the pipelines with a solid line. Here, the actions of the various component parts of the apparatus are controlled by causing the control device 350 to perform a processing operation based on the numerical data from the detectors of the various components parts of the apparatus. The present embodiment optionally allows the actions of the various component parts to be individually controlled by connecting the detectors of the components parts and the operating parts of the valves individually to the relevant liquid level indicators, flow rate indicators, liquid level adjusting meters, and flow rate adjusting meters.

Now, the method for preparation and supply implemented by using the apparatus for the preparation and supply of a polymerization inhibitor illustrated in FIG. 3 will be described below with reference to the drawings annexed hereto.

FIG. 8 is a graph showing in outline the time-course changes of the liquid level, the feed rate of the PIS, and the concentration of the polymerization inhibitor in the tank which are prepared by the method for preparation and supply implemented by using the apparatus for preparing and supplying the polymerization inhibitor batch-wise illustrated in FIG. 3.

As illustrated in FIGS. 3 and 8, the CAL from the CAL tank is introduced through the pipeline 357 into the preparation tank (A) 351 via the CAL input port 359 till the level ① shown in FIG. 8 is reached while the total quantity of liquid in the preparation tank (A) 351 and the supply tank (B) 352 is kept controlled at a fixed level. The term "control" as used herein means a procedure which comprises causing the control device 350 to perform a processing operation based on the numerical data mainly of the flow rate detectors 309 and 319 and the liquid level detectors 317a and 317b, actuating the on-off valve 308 based on the result of the processing operation, and controlling the quantity of the CAL introduced into the preparation tank (A) 351. The on-off valve 308 is closed to stop the introduction of the CAL at the time that the level ① for stopping the supply of the CAL is reached.

Then, in order that the concentration of the PIS prepared batch-wise in the supply tank (A) 351 may be fixed, the gate valve 313 is opened to introduce the polymerization inhibitor from the hopper 301 through the pipeline 353 into the preparation tank (A) 351 via the polymerization inhibitor input port 355 after the level ① for stopping the supply of the CAL shown in FIG. 8 has been reached. The gate valve 313 is closed to stop the introduction of the polymerization inhibitor at the time that the level ② for stopping the introduction of the polymerization inhibitor is reached.

Thereafter, in the supply tank (A) 351, the PIS is adjusted to a uniform concentration by operating a stirring device 302 disposed in the tank for a prescribed duration thereby stirring and mixing the polymerization inhibitor and the CAL introduced sequentially therein. The operation of the stirring device 302 is stopped at the time that the level ③ for completing the stirring and mixing shown in FIG. 8.

The PIS consequently obtained is transferred from the preparation tank (A) 351 to the supply tank (B) 352. This transfer is initiated by opening the on-off valve 328 at the time that the level ③ for completing the stirring and mixing shown in FIG. 8 and continued till the level ④ for stopping the transfer of the PIS shown in FIG. 8 is reached. At the time that the greater part of the PIS (indicated by a prescribed liquid level in the preparation tank (A) 351; about 50–95% of the inner volume of the tank) has been transferred (the level (A) for the stop of the transfer of the PIS shown in FIG. 8), the valve 328 is closed to complete the transfer of the liquid.

The PIS which has been transferred to the supply tank (B) 352 is continuously extracted by the liquid transfer pump 303 via a PIS feed opening (outlet) 363 and constantly transferred through a pipeline 361 to the devices of the next step while the quantity of the PIS transferred to the next step is controlled to be fixed. The term "control" as used herein means a procedure which comprises causing the control device 350 to perform a processing operation based on the numerical data mainly from the feed rate detectors 309 and 319 and the liquid level detectors 317a and 317b, actuating the on-off valve 318 based on the result of the processing operation, and controlling the quantity of the PIS discharged from the supply tank (B) 352 and transferred to the next step.

Then, part of the PIS which has been extracted via the PIS feed opening (outlet) 363 is circulated through the pipeline 365 into the supply tank (B) 352. In the meanwhile, the heat exchanger 304 disposed on the line of the pipeline 365 is relied on to adjust the temperature of the PIS at an adequate level for preventing the solution from forming a polymer at the next step. Incidentally, in the present embodiment, the flow rates and the computations of concentration are automatically controlled invariably.

Incidentally, on the preparation tank (A) 351, at the time that the level ④ for stopping the transfer of the PIS shown in FIG. 8 is reached, the on-off valve 308 is opened to introduce the CAL from the CAL tank through the pipeline 357 into the preparation tank (A) 351 via the CAL input port 359.

In the present embodiment, the supply of the liquid from the preparation tank (A) 351 to the supply tank (B) 352 can be carried out very stably except the flow rate is temporarily destabilized during the course of the supply (refer to FIG. 8). By the same token, the present embodiment can manifest truly outstanding operation and effect of enabling the total quantity of the liquids in the preparation tank (A) 351 and the supply tank (B) 352 and the concentration of the polymerization inhibitor in the supply tank (B) 352 at respectively fixed levels invariably.

FIG. 4 is a schematic diagram of the apparatus representing another typical embodiment (the third embodiment) of the apparatus contemplated by this invention for the preparation and supply of a polymerization inhibitor batch-wise. In the present embodiment, two tanks are used mutually supplementarily, one of the tanks used as a main tank for preparing a PIS and supplying the PIS to the next step and to the other tank and the other tank used as a sub tank for storing the PIS brought at an adjusted concentration from the one tank and supplying the PIS supplementarily to the next step exclusively during the preparation of the PIS in the one tank. As a result, the apparatus as a whole is enabled, while preparing the PIS batch-wise, to supply the PIS of adjusted concentration continuously at a fixed rate stably and safely.

As the fourth embodiment concerning the apparatus of this invention for the preparation and supply of a polymerization inhibitor, one tank is divided with a partition plate 405 into two tanks as illustrated in FIG. 4. One of them is a tank for preparing a PIS and also a so-called main tank 451, i.e. a tank for supplying the PIS of adjusted concentration in a fixed duration to the other tank and, at the same time, supplying it stably at a fixed flow rate to the next step. The other is a so-called subtank 452 for storing the PIS brought in mainly from the main tank 451 through a circulating line and supplying the PIS supplementarily to the next step exclusively during the preparation of the PIS in the main tank 451. As a result, the PIS can be continuously supplied stably at a fixed flow rate to the next step. While the division of one tank with a partition plate into two tanks has been described, the present embodiment may construct the same apparatus by using two independent tanks. The number of tanks may be increased without departure from the spirit of the present embodiment.

As a means for transferring the liquid from the sub tank 452 to the main tank 451 both mentioned above, a pipeline (overflow line) 406 sloped to advance the flow from the sub tank 452 to the main tank 451 is internally connected. The portion of the PIS circulated at an adjusted temperature in the sub stank 452 by the liquid transfer means mentioned above as will be specifically described herein below which surpasses the fixed liquid level overflows the pipeline 406 on the sub tank 452 through an opening and flows down toward the main tank 451 by dint of the difference of height. Though the internal connection of the pipeline 406 has been described, the present embodiment allows the pipeline 406 to be externally connected.

The main tank 451 mentioned above is provided with a liquid level detector 417 for the purpose of detecting the liquid level in the tank. Further, this liquid level detector is connected to the control device 450.

The main tank 451 is provided in the upper part thereof with a polymerization inhibitor input port 455. Further, for the purpose of supplying the polymerization inhibitor into the main tank 451, a hopper 401 is connected to the polymerization inhibitor input port 455 through the medium of a pipeline 453.

As a means for controlling the quantity of the polymerization inhibitor to be introduced into the main tank 451 mentioned above, the pipeline 453 is provided on the line thereof with a gate valve 413. Further, the gate valve 413 is connected to the control device 450.

Incidentally, the present embodiment also may contemplate incorporating therein a means for generating vibration and a means for introducing an inert gas to the hopper as the same means for preventing the wetting of the polymerization inhibitor with the condensate of steam, the adhesion of powder, the formation of a powder bridge, and the generation of steam from the tank that were used in the first embodiment.

Further, the main tank 451 is provided in the upper part thereof with a CAL input port 459. For the purpose of supplying the CAL into the main tank 451, the CAL tank (not shown) of the former step is connected to the CAL input port 459 through the medium of a pipeline 457.

As a means for controlling the flow rate of the CAL into the main tank 451, the pipeline 457 mentioned above is provided on the line thereof with a flow rate detector 409 and an on-off valve 408. The detector and the valve are connected to the control device 450.

The main tank 451 is provided with a propeller type-stirring device 402 as a stirring and mixing means for stirring and mixing the CAL and the polymerization inhibitor periodically supplied into the main tank 451 batch-wise thereby preparing a PIS of adjusted concentration stably. Further, the stirring device 402 (the driving part for a motor) is connected to the control device 450. The present embodiment, when necessary, may contemplate having the sub tank 452 also provided with a mixing means.

The main tank 451 is provided in the lower part thereof with a PIS feed opening (outlet) 464 with the object of enabling the PIS to be extracted from the main tank 451. This feed opening 464 is connected to the next step through the medium of a pipeline 461. By the same token, the sub tank 452 is provided in the lower part thereof with a PIS feed opening 463 for the purpose of enabling the PIS to be extracted from the sub tank 452. This feed opening 463 is connected to the apparatus of the next step via a pipeline 462 (a confluence 460) through the medium of the pipeline 461.

As a liquid transfer means for enabling the PIS extracted from the main tank 451 or the sub tank 452 to be stably transferred, the pipeline 461 is provided on the line thereof posterior to the confluence 460 mentioned above with a liquid transfer pump 403. Though the confluence of the lines for supply to the next step into one line has been described, the present embodiment may contemplate allowing such individual supply lines to be connected independently of one another to the next step. The liquid transfer pump 403 is not particularly restricted but only required to be capable of continuously extracting the liquid at a fixed flow rate.

As a means for controlling the flow rate of the PIS which is continuously extracted alternately from the main tank 451 and the sub tank 452, the pipeline 461 to the posterior of the liquid transfer pump 403 is provided on the line thereof with a flow rate detector 419 and an on-off valve 418. As a result, the PIS can be stably supplied constantly at a fixed flow rate to the next step without reference to the variation in the quantity of the solution to be discharged. The detector and the valve are further connected to the control device 450.

As a feed line-switching means for switching the origins of supply of the PIS to the next step, the pipeline 461 preceded by the confluence 460 is provided on the line thereof with an on-off valve 414, and a pipeline 462 preceded by the confluence 460 is provided on the line thereof with an on-off valve 415. These valves are further connected to the control device 450. Though the use of individual on-off valves on the relevant pipelines has been described, the present embodiment may contemplate providing the confluence 460 with a flow line-switching valve with the object of allowing the origins of supply of the PIS to be switched.

Further, as a means for adjusting the temperature of the PIS transferred to the next step, a pipeline 465 branched from the pipeline 461 intervening between the liquid transfer pump 403 and the flow rate detector 419 mentioned above is connected to the upper part of the sub tank 452. Then the pipeline 465 is provided on the line thereof with a heat exchanger 404. By this liquid temperature adjusting means, part of the PIS forwarded by the liquid transfer pump 403 can be circulated into the sub tank 452 and can be subjected meanwhile to heat exchange. As a result, the temperature of the PIS being circulated can be adjusted and the temperature of the liquid in the tank and consequently the temperature of the PIS being transferred to the next step can be retained at respectively adequate levels. Though the provision of a heat exchanger for the adjustment of liquid temperature has been described, the means for the adjustment of the liquid temperature need not be particularly restricted.

In the diagram, the circuits of the control system are indicated with a broken line and the lines of the pipelines with a solid line. Here, the control device 450 is relied on to perform a processing operation based on the numerical data from the detectors of various component parts of the apparatus and control the actions of the various component parts in the apparatus. The present embodiment may contemplate connecting the detectors of the various component parts and the operating parts of the valves individually to liquid level indicators, flow rate indicators, liquid level adjusting meters, and flow rate adjusting meters and controlling the actions of the component parts individually.

Now, the method for preparation and supply implemented by using the apparatus for the preparation and supply of a polymerization inhibitor illustrated in FIG. 4 will be described below with reference to the drawings annexed hereto.

FIG. 9 is a graph showing in outline the time-course changes of the liquid level, the feed rate of the PIS, and the concentration of the polymerization inhibitor in the tank prepared by the method for preparation and supply implemented by using the apparatus for the preparation and supply of a polymerization inhibitor batch-wise illustrated in FIG. 4.

As illustrated in FIGS. 4 and 9, the following process is continued till the liquid level on the main tank 451 detected by the liquid level detector 417 provided in the main tank 451 reaches the level ① for starting the adjustment of the PIS shown in FIG. 9 (the liquid level capable of preventing the occurrence of pump cavitation=about 5–20% of the total volume). The valve 415 on the sub tank 452 is shut and the on-off valve 414 on the main tank 451 is opened, and the PIS of adjusted concentration in the main tank 451 is extracted by the liquid transfer pump 403 through the PIS feed opening (outlet) 464 and supplied through the pipeline 461 to the next step while the feed rate to the next step is controlled so as to remain fixed constantly. The term "control" as used herein means a procedure which comprises causing the control device 450 to perform a processing operation based on the numerical data mainly from the flow rate detector 419 and the liquid level detector 417, actuating the on-off valve 418 based on the result of the processing operation, and controlling the quantity of the PIS discharged from the main tank 451 and transferred to the next step. At the same time, the solution is supplied through the pipeline 465 into the subtank 452, with the liquid temperature controlled meanwhile with the heat exchanger 404. The portion of the PIS so circulated into the sub tank 452 which surpasses the fixed liquid level is allowed to flow down through the pipeline 406 into the main tank 451 and subjected to adjustment of temperature.

Then, the on-off valve 414 is shut and the on-off valve 415 is opened and the feed line to the next step is switched from the main tank 451 to the sub tank 452 after the liquid level on the main tank 451 has reached the level for starting the adjustment of the PIS (the level ① in FIG. 9). As a result, the PIS in the sub tank 452 is extracted by the liquid transfer pump 403 and transferred via the pipeline 462 through the pipeline 461 to the next step, with the feed rate of the solution to the next step controlled so as to remain fixed constantly. The term "control" as used herein means a procedure which comprises causing the control device 450 to perform a processing operation based on the numerical data mainly of the flow rate detector 419, actuating the on-off valve 418 based on the result of the processing operation, and controlling the quantity of the PIS discharged from the sub tank 452 and transferred to the next step. At the same time, the solution is circulated through the pipeline 465 into the sub tank 452, with the temperature of the solution controlled meanwhile with the heat exchanger 404.

Thereafter, the valve (line) at the origin of supply of the PIS to the next step is switched (this switching entailing a certain amount of time lag and giving rise to a period in which the feed rate of the PIS is momentarily destabilized, refer to FIG. 9) (at the point of time of ② shown in FIG. 9).

On the main tank 451, the on-off valve 408 is opened and the CAL from the CAL tank is introduced through the pipeline 457 via the CAL input port 459 into the main tank 451 till the prescribed liquid level (the level for stopping the adjustment of the PIS; the point ③ in FIG. 9). The on-off valve 408 is shut at the level ③ for stopping the adjustment of the PIS shown in FIG. 9.

Then, on the main tank 451, after the level for stopping the adjustment at ③ shown in FIG. 9 is reached, the gate valve 413 is opened and the polymerization inhibitor from the hopper 401 is introduced through the pipeline 453 via the polymerization inhibitor input port 455 till the prescribed liquid level (the level for stopping the introduction of the polymerization inhibitor; the point ④ shown in FIG. 9) is reached. The gate valve 413 is shut at the level ④ for stopping the introduction of the polymerization inhibitor.

Thereafter, further on the main tank 451, the CAL and the polymerization inhibitor sequentially supplied into the main tank 451 are stirred and mixed by operating the stirring device 402 disposed in the same time for a prescribed period (up to the point ⑤ shown in FIG. 9) to produce a PIS adjusted to a uniform concentration.

In the meantime, on the sub tank 452, the PIS stored in the same tank 452 supplementarily is continuously supplied stably to the next step through the feed line (the pipeline 462→the pipeline 461) formed by the on-off valve 415 opened at the point ① between the points ①–⑤ (namely during the preparation of the PIS in the main tank). At the same time, part of the PIS is circulated through the pipeline 465 into the sub tank 452, with the temperature thereof adjusted meanwhile.

Then, at the time that the stirring is completed (the point ⑤ shown in FIG. 9), the on-off valve 414 on the main tank 451 is opened and the on-off valve 415 on the sub tank 452 is shut and the origin for supply of the PIS to the next step is switched from the sub tank 452 to the main tank 451. As a result, the PIS in the main tank 451 is extracted from the main tank 451 via the PIS feed opening (outlet) 464 by the liquid transfer pump 403 and, with the feed rate thereof meanwhile controlled so as to remain fixed constantly, and transferred through the pipelines 462 and 461 to the apparatus of the next step. In the present embodiment, the supply can be continued very stably excepting the flow rate is momentarily destabilized during the switch of the valve from the sub tank 452 to the main tank 451 and the switch of the valve from the main tank 451 to the sub tank 452 (refer to FIG. 9).

Incidentally, the portion of the PIS that surpasses the prescribed liquid level in the sub tank 452 is constantly transferred from the subtank 452 to the main tank 451 through the overflow line 406.

Then, part of the PIS which is continuously extracted through the PIS feed opening (outlet) 464 or 463 of the main tank 451 or the sub tank 452 is constantly circulated through the pipeline 465 into the sub tank 452. In this while, the temperature of the PIS is adjusted to an adequate level by the heat exchanger 404 provided on the line of the pipeline 465. As a result, the variation of the temperature of the PIS supplied to the next step is repressed and the possible formation and deposition of a polymer in the devices and the pipelines of the next step is effectively prevented. The present embodiment prefers the flow rates and the computations of concentration to be automatically controlled through the control device 450.

By the present embodiment, the feed rate of the PIS and the concentration of the polymerization inhibitor in the tank serving as a supply tank can be invariably retained at respectively fixed levels as illustrated in FIG. 9 in spite of possible variations of the liquid level in the main tank 451 and the sub tank 452.

FIG. 5 is a schematic diagram of the apparatus representing one typical embodiment (the fourth embodiment) of the apparatus contemplated by this invention for preparing and supplying a polymerization inhibitor batch-wise. In the present embodiment, two tanks are used as disposed in parallel connection. One of the tanks produces the PIS and the other tank supplies the PIS. They repeat these operations alternately. The apparatus as a whole is enabled to effect continuous fixed-quantity supply of the solution.

The fourth embodiment of the apparatus of this invention for the preparation and supply of the polymerization inhibitor has two independent tanks. For the sake of convenience, the tank on the left side will be referred to as a first tank 551 and the tank on the right side, in the bearings of the diagram, as a second tank 552. As noted in FIG. 5, they are both capable of preparing a PIS and, at the same time, supplying the produced PIS to the next step The first tank 551 mentioned above is provided with a liquid level detector 517a for the purpose of detecting the liquid level in the tank. Likewise, the second tank 552 is provided with a liquid level detector 517b for the purpose of detecting the liquid level in the tank. These liquid level detectors are further connected to a control device 550.

The first tank 551 is provided in the upper part thereof with a polymerization inhibitor input port 555a and a hopper 501a is connected through a pipeline 553a to the polymerization inhibitor input port 555a for the purpose of supplying the polymerization inhibitor into the first tank 551. Likewise, the second tank 552 is provided in the upper part thereof with a polymerization inhibitor input port 555b and a hopper 501b is connected to the polymerization inhibitor input port 555b through the medium of a pipeline 553b for the purpose of supplying the polymerization inhibitor into the second tank 552. Optionally, the present embodiment may contemplate utilizing a switch valve provided on the pipeline from one hopper for effecting the introduction of the polymerization inhibitor timely into the first and second tanks.

As a means for controlling the feed rate of the polymerization inhibitor to the first tank 551, the pipeline 553a is provided on the line thereof with a gate valve 513a. As a means for controlling the feed rate of the polymerization inhibitor to the second tank 552, the pipeline 553b is provided on the line thereof with a gate valve 513b. These gate valves are further connected to the control device 550.

Incidentally, the present embodiment may contemplate incorporating therein a vibration generation means and a means for introducing an inert gas into a hopper as the same means for preventing the wetting of the polymerization inhibitor with the condensate of steam, the adhesion of powder, the formation of a power bridge, and the generation of steam from the tank which were used in the first embodiment.

Further, for the purpose of supplying the CAL into the first tank 551, the first tank 551 is provided in the upper part thereof with a CAL inlet port 559a and the CAL tanks (not shown) of the preceding step are connected to the CAL input port 559a through the medium of pipelines 557a and 558. Likewise, the second tank 552 is provided in the upper part thereof with a CAL input port 559b and CAL tanks are connected through the pipelines 557b and 558 to the CAL input port 559b. Here, the pipeline 558 from one CAL tank is branched at a point of branching 556 halfway in the length thereof into two lines 557a and 557b and connected respectively to the first tank and the second tank. The present embodiment may contemplate providing the first tank and the second tank respectively with two corresponding CAL tanks and consequently forming mutually independent feed lines for the CAL.

Further, as a means for controlling the feed rate of the CAL directed toward the first tank 551 or the second tank 552, the pipeline 558 is provided on the line thereof with a flow rate detector 509 and an on-off valve 508. The detector and the valve are further connected to the control device 550.

As a means for switching the line of supply of the CAL to the first tank 551 or the second tank 552, the pipeline 557a mentioned above is provided on the line thereof with an on-off valve 516a and the pipeline 557b is provided on the line thereof with an on-off valve 516b. These on-off valves are further connected to the control device 550.

As a stirring and mixing means for stirring and mixing the CAL and the polymerization inhibitor intermittently supplied batch-wise into the first tank 551 and effecting stable preparation of a PIS of adjusted concentration, the first tank 551 is provided with a propeller type-stirring device 502a. Likewise, as a stirring and mixing means for stirring and mixing the CAL and the polymerization inhibitor intermittently supplied batch-wise into the second tank 552 and effecting stable preparation of a PIS of adjusted concentration, the second tank is provided with a propeller type-stirring device 502b. These stirring devices 502a and 502b are further connected to the control device 550.

Further, the first tank 551 is provided in the lower part thereof with a PIS feed opening 563a, which is connected to the apparatus of the next step (not shown) through the medium of a pipeline 561. As a result, the PIS prepared in the tank can be extracted. Likewise, the second tank 552 is provided in the lower part thereof with a PIS feed opening 563b, which is connected to the apparatus of the next step via a pipeline 562 (a point of confluence 560) and through the pipeline 561.

As a liquid transfer means for stably transferring the PIS extracted from the first tank 551 or the second tank 552, the pipeline 561 is provided on the line thereof to the posterior of the point of confluence 560 with a liquid transfer pump 503. Here, the lines of supply to the next step are conjoined into one line. The present embodiment may contemplate forming the individual lines of supply so as to be connected independently to the next step. Further, the present embodiment may contemplate incorporating therein a line of circulation for adjusting the temperature of the liquid as by heat exchange.

As a flow rate controlling means for extracting the PIS through the feed openings 563a and 563b and stably supplying the solution at a fixed flow rate constantly to the next step, the pipeline 561 on the line thereof to the posterior of the liquid transfer pump 503 with a flow rate detector 519 and an on-off valve 518. The detector and the valve are further connected to the control device 550.

As a feed line-switching means for switching the origins of supply of the PIS to the next step, the pipeline 561 is provided on the line thereof preceding the point of confluence 560 with an on-off valve 514 and a pipeline 562 is provided on the line thereof preceding the point of confluence 560 with an on-off valve 515. These on-off valves are further connected to the control device 550. Here, the on-off valves are used severally on the relevant pipelines. The present embodiment may contemplate providing the point of confluence 560 with a line-switching valve thereby switching the origins of supply of the PIS.

Incidentally, in the diagram, the circuits for the control system are indicated with a broken line and the lines of the pipelines are indicated with a solid line. Here, the control device 550 is relied on to perform a processing operation based on the numerical data from the detectors of the component parts of the apparatus and control the actions of the component parts in the apparatus. The present embodiment may contemplate connecting the detectors of the component parts and the operating parts of the valves individually to liquid level indicators, flow rate indicators, liquid level adjusting meters, and flow rate adjusting meters and individually controlling the actions of the component parts.

Now, the method for preparation and supply implemented by using the apparatus for the preparation and supply of a polymerization inhibitor will be described with reference to FIG. 5.

FIG. 10 is a graph showing in outline the time-course changes of the liquid level, the feed rate of the PIS, and the concentration of the polymerization inhibitor in the tank prepared by the method for preparation and supply implemented by using the apparatus for the preparation and supply of a polymerization inhibitor batch-wise illustrated in FIG. 5.

As illustrated in FIGS. 5 and 10, the first tank 551 and the second tank 552 are controlled so as to control the total of the liquids contained therein fixed. The term "control" as used herein means a procedure which comprises causing the control device 550 to perform a processing operation based on the numerical data mainly from the flow rate detectors 509 and 519 and the liquid level detectors 517a and 517b, actuating the valve 508 based on the result of the processing operation, and controlling the quantity of liquid introduced into the first tank 551 and the quantity of liquid supplied from the second tank 552 to the next step. On the first tank 551 kept under continued control, the on-off valve 514 and the gate valve 513a are shut and the on-off valves 508 and 516a are opened and the CAL from the concentration liquid tank is continuously introduced into the first tank 551 through the pipelines 558 and 557a via the CAL input port 559a till the prescribed liquid level (the level for stopping the adjusting liquid; the point ① shown in FIG. 10) is reached. At the level ① for stopping the adjusting liquid shown in FIG. 10, the on-off valves 516a and 508 are shut.

On the second tank 552, the on-off valve 516b and the gate valve 513b are shut and the on-off valves 515 and 518 are opened and the CAL is extracted through the PIS feed opening (outlet) 563b and continuously transferred through the pipelines 562 and 561 to the apparatus of the next step by the liquid transfer pump 503 till the point ③ shown in FIG. 10 is reached.

Meanwhile, on the first tank 551, after the level ① for stopping the adjusting liquid shown in FIG. 10 has been reached, the gate valve 513a is opened and the polymerization inhibitor from the hopper 501a is introduced into the first tank 551 through the pipeline 553a via the polymerization inhibitor input port 555a till the prescribed liquid level (the level for stopping the introduction of the polymerization inhibitor; the point ② shown in FIG. 10) is reached. At the level ② for stopping the introduction of the polymerization inhibitor, the gate valve 513a is shut.

Thereafter, on the first tank 551, a PIS adjusted to uniform concentration is produced by operating the stirring device 502a provided on the tank for a prescribed duration (the period between the points ② and ③ shown in FIG. 10) thereby stirring and mixing the CAL and the polymerization inhibitor sequentially supplied into the tank.

Then, at the point ③ shown in FIG. 10, the valve 514 on the first tank 551 is opened and the valve 515 on the second tank 552 is shut and the tank as the supply to the next step is switched from the second tank 552 to the first tank 551. On the second tank 552, the valves 516b and 508 are opened and the tank on the side for preparing the PIS is switched from the first tank 551 to the second tank 552.

Thereafter, the series of operations on the first tank 551 and the second tank 552 which have been described thus far are performed alternately. By repeating the series of operations, it is possible to supply the PIS continuously to the next step. The flow rates and the computations of concentration are invariably controlled automatically with the control device 550.

In the present embodiment, the supply can be continued very stably excepting that the flow rates are momentarily destabilized during the switching of the valves at the point of time ③ shown in FIG. 10. (refer to FIG. 10)

EXAMPLES

Now, this invention will be described more specifically below with reference to examples.

Example 1

The apparatus illustrated in FIG. 2 was used to perform preparation and supply of a polymerization inhibitor. A vertical cylindrical tank having an inner volume of 5 m$^3$ and made of stainless steel (SUS 304) was divided with a partition plate 205 into two tanks. The divided tanks were interconnected with a pipeline 206. The larger tank had an inner volume of 4 m$^3$ and the smaller tank had an inner volume of 1 m$^3$. The larger tank 251 was furnished with a propeller type-stirring device 202 so as to be used as a preparation tank and the smaller tank 252 was used as a supply tank. Further, a hopper 201 fitted with a load cell, a powder-supplying device 212 (available from Taisei Kogyo K.K. in Japan, type of "Smooth Auto Feeder"), a liquid transfer pump 203 (a canned pump), and a spiral type heat exchanger 204 were used. A volumetric flow meter was used as a flow rate meter and a differential pressure type level gauge was used as a liquid level meter.

The CAL was composed of 100 wt. % of acrylic acid and phenothiazine was used as the polymerization inhibitor. A PIS having the polymerization inhibitor concentration set at 1 wt. % was continuously supplied from the supply tank to the next step at a flow rate of 100 kg/h.

The CAL was continuously introduced so as to control the liquid level fixed in the supply tank and, phenothiazine was continuously introduced by the use of a load cell 211 and a powder-supplying device 212 so as to control the polymerization inhibitor concentration fixed. By means of an overflow 206, the PIS was constantly transferred from the preparation tank to the supply tank. The flow rates and the computations of concentration were automatically controlled constantly. The propeller type-stirring device 202 was operated continuously.

The results of the preceding operation are shown in FIG. 7 and Table 1. The polymerization inhibitor concentration was stabilized at a fixed concentration (1 wt. %). The operation was free from such problems as variation of the quantity of supply to the next step (100 kg/h), occurrence of a polymer, and deterioration of quality.

Example 2

In contrast to Example 1, the apparatus illustrated in FIG. 3 was used to perform preparation and supply of a polymerization inhibitor. Two vertical cylindrical tanks having an inner volume of 5 m$^3$ and made of stainless steel (SUS 304) were so equipped as to form one preparation tank furnished with a propeller type-stirring device and one supply tank. A hopper 301, a liquid transfer pump 303 (a canned pump), and a spiral type heat exchanger 304 were also used. A volumetric flow meter was used as a flow rate meter and a differential pressure type level gauge was used as a liquid level meter.

The compositions of liquid and polymerization inhibitor, the flow rates, and set concentrations were the same as in Example 1.

The CAL was continuously introduced into the preparation tank and the supply tank so as to control the total quantity of liquid fixed. Phenothiazine was introduced by opening a valve 313 after the level ① for stopping the adjustment shown in FIG. 8 was reached. Thereafter, the propeller type-stirring device 302 was operated for about 10 minutes and a valve 328 was opened at the point of time ③ for completing the agitation to transfer the PIS from the preparation tank 351 to the supply tank 352. The flow rates and the computations of concentration were automatically controlled constantly.

The results of the operation are shown in FIG. 8 and Table 1. The polymerization inhibitor concentration was stabilized at a fixed concentration (1 wt. %). The operation incurred no problems such as occurrence of a polymer and deterioration of quality, though the feed rates to the next step (100 kg/h) were slightly varied during the transfer of liquid.

Example 3

In contrast to Example 1, the apparatus illustrated in FIG. 4 was used to perform preparation and supply of a polymerization inhibitor. A vertical cylindrical tank having an inner volume of 5 m$^3$ and made of stainless steel (SUS 304) was divided with a partition plate 405 into two tanks and the divided tanks were interconnected with a pipeline 406. The larger tank had an inner volume of 4 m$^3$ and the smaller tank an inner volume of 1 m$^3$. The larger tank was furnished with a propeller type-agitating device 402. A hopper 401, a liquid transfer pump 403 (a canned pump), and a spiral type heat exchanger 404 were also used. A volumetric flow meter was used as a flow rate meter and a differential pressure type level gauge was used as a liquid level meter.

The compositions of liquids and a polymerization inhibitor, the flow rates, and the set concentrations were the same as in Example 1.

After the liquid level on the 4 m$^3$ side had reached the level ① for starting the adjustment as shown in FIG. 9, a valve 414 was shut and a valve 415 was opened to switch the supply to the next step from the larger tank of 4 m$^3$ to the smaller tank of 1 m$^3$. Then, a valve 408 was opened to introduce the CAL. The phenothiazine was introduced by opening a valve 413 after the level ③ for stopping the adjustment was reached. Thereafter, the stirring device 402 was operated for about 10 minutes. At the point of time ⑤ for completing the agitation, the valve 414 was opened and the valve 415 was shut to switch the supply to the next step from the smaller tank of 1 m$^3$ to the larger tank of 4 m$^3$. By means of an overflow 406, the liquid was constantly transferred from the smaller tank of 1 m$^3$ to the larger tank of 4 m$^3$. The flow rates and the computations of concentration were automatically controlled constantly.

The results are shown in FIG. 9 and Table 1. The polymerization inhibitor concentration was stabilized at a fixed concentration (1 wt. %). The operation incurred no problems such as occurrence of a polymer and deterioration of quality, though the feed rates to the next step (100 kg/h) were slightly varied during the switch of valve.

Example 4

In contrast to Example 1, the apparatus illustrated in FIG. 5 was used to perform preparation and supply of a polymerization inhibitor. Two vertical cylindrical tanks having an inner volume of 5 m$^3$ and made of stainless steel (SUS 304) were each furnished with propeller type-stirring devices 502a and 502b and a hopper 501a and 501b. A liquid transfer pump 503 (a canned pump), and a spiral type heat exchanger 504 were also externally used. A volumetric flow meter was used as a flow rate meter and a differential pressure type level gauge was used as a liquid level meter. One of the tanks was used as a preparation tank (A) and the other as a supply tank (B).

The compositions of liquids and polymerization inhibitor, the flow rates, and the set concentrations were the same as in Example 1.

The CAL was continuously introduced into the first tank 551 and the second tank 552 so as to control the total quantity of liquid fixed. The phenothiazine was introduced by opening a valve 513a after the level ① for stopping the adjustment shown in FIG. 10 was reached. Thereafter, the propeller type-stirring device 502a was operated for about 10 minutes and a valve 514 was opened and a valve 515 was shut at the point of time ③ to switch the supply to the next step from the second tank 552 to the first tank 551. A valve 516b was opened and a valve 516a was shut to switch the tank for performing the preparation of a PIS from the first tank 551 to the second tank 552. The flow rates and the computations of concentration were automatically controlled constantly.

The results of the operation are shown in FIG. 10 and Table 1. The polymerization inhibitor concentration was stabilized at a fixed concentration (1 wt. %). The operation incurred no such problems as occurrence of a polymer and deterioration of quality, though the feed rates to the next step (100 kg/h) were slightly varied during the switch of valve.

Comparative Example 1

In contrast to Example 1, the apparatus illustrated in FIG. 1 was used. In a vertical cylindrical tank having an inner volume of 5 m$^3$ and made of stainless steel (SUS 304), a propeller type-stirring device 102 and a hopper 101 were used. A liquid transfer pump 103 (a canned pump) was also used. A volumetric flow meter was used as a flow rate meter and a differential pressure type level gauge was used as a liquid level meter.

The concentrations of liquids and polymerization inhibitor, the flow rates, and the set concentrations were the same as in Example 1.

After the liquid level had reached the level ① for starting the adjustment as shown in FIG. 6, a valve 108 was opened to introduce the CAL. The phenothiazine was introduced by opening a valve 107 after the level ③ for stopping the adjustment was reached. Thereafter, the propeller type-stirring device 102 was operated for about 10 minutes.

The results of the operation are shown in FIG. 6 and Table 1. The polymerization inhibitor concentration was retained at the fixed concentration (1 wt. %) only with difficulty because of the liquid short-path and the insufficient mixture during the introduction of the CAL. The feed rate (100 kg/h) to the next step was destabilized by variation in pressure and variation in temperature during the introduction of the CAL. The pipelines and the devices in the next step incurred deposition of a polymer. The variation of the polymerization inhibitor concentration resulted in deterioration of the quality.

TABLE 1

| Item | Example 1 | Example 2 | Example 3 | Example 4 | Comparative Example 1 |
|---|---|---|---|---|---|
| (Drawing) (Apparatus for preparation and supply) Tank | FIGS. 2 and 7 | FIGS. 3 and 8 | FIGS. 4 and 9 | FIGS. 1 and 10 | FIGS. 1 and 6 |
| Number | 1 | 2 | 1 | 2 | 1 |
| Type | Vertical cylinder | Vertical cylinder | Vertical cylinder | Vertical cylinder | Vertical cylinder |
| Partition plate | Yes | No | Yes | No | No |
| Volume ($m^3$) | 5 (1 + 4) | 5 | 5 (1 + 4) | 5 | 5 |
| Stirring device Type | Propeller | Propeller | Propeller | Propeller | Propeller |
| Hopper Volume ($m^3$) | 1 | 1 | 1 | 1 | 1 |
| Powder supplying device Type | Product of Taisei Kogyo K.K. Smooth Auto Feeder | No | No | No | No |
| Measuring instrument | | | | | |
| Flow meter | Volumetric | Volumetric | Volumetric | Volumetric | Volumetric |
| Liquid level meter | Differential pressure | Differential pressure | Differential pressure | Differential pressure | Differential pressure |
| Load cell | Yes | No | No | No | No |
| (Drawing) (Composition) | FIGS. 2 and 7 | FIGS. 3 and 8 | FIGS. 4 and 9 | FIGS. 1 and 10 | FIGS. 1 and 6 |
| Concentration adjusting liquid | Acrylic acid 100 weight % | Acrylic acid 100 weight % | Acrylic acid 100 weight % | Acrylic acid 100 weight % | Acrylic acid 100 weight % |
| Polymerization inhibitor | Phenothiazine | Phenothiazine | Phenothiazine | Phenothiazine | Phenothiazine |
| Polymerization inhibitor solution | Acrylic acid 99 weight % Phenothiazine 1 weight % | Acrylic acid 99 weight % Phenothiazine 1 weight % | Acrylic acid 99 weight % Phenothiazine 1 weight % | Acrylic acid 99 weight % Phenothiazine 1 weight % | Acrylic acid 99 weight % Phenothiazine 1 weight % |
| (Flow rate) | | | | | |
| Concentration adjusting liquid | 99 kg/h continuous supply | About 99 kg/h cont. supply | Batch supply | About 99 kg/h cont. supply | Batch supply |
| Polymerization inhibitor | 1 kg/h continuous supply | Batch supply | Batch supply | Batch supply | Batch supply |
| Polymerization inhibitor solution | 100 kg/h continuous supply | 100 kg/h continuous supply | 100 kg/h continuous supply | 100 kg/h continuous supply | 100 kg/h continuous supply |
| (Drawing) (Situation) | FIGS. 2 and 7 | FIGS. 3 and 8 | FIGS. 4 and 9 | FIGS. 1 and 10 | FIGS. 1 and 6 |
| Variation in polymerization inhibitor concentration | No | No | No | No | Yes |
| Variation in feed rate | No | Slight variation | Slight variation | Slight variation | Yes |
| Occurrence and adhesion of polymer | No | No | No | No | Yes |
| Deterioration of quality | No | No | No | No | Yes |
| Others | No | No | No | No | No |

The entire disclosure of Japanese Patent Application Nos. 2001–303327 filed on Sep. 28, 2001 including specification, claims, drawings and summary are incorporated herein by reference in its entirety.

What is claimed is:

1. An apparatus for the preparation and supply of a polymerization inhibitor solution (PIS) which is used in a chemical plant handling an easily polymerizable compound by adjusting a polymerization inhibitor with a concentration adjusting liquid (CAL), and continuing a stable supply of the PIS at an adequate step in the chemical plant, comprising:
   at least two tanks serially connected with a pipeline, wherein one of the tanks is a PIS preparation tank and another of the tanks is a PIS supply tank;
   a stirring device, a liquid level detector, a polymerization inhibitor input port, a concentration-adjusting liquid input port, and a polymerization inhibitor solution feed opening, each being installed in the PIS preparation tank and the polymerization inhibitor input port is connected to a hopper;
   a concentration-adjusting liquid tank connected to the preparation tank; and
   a feed opening capable of extracting the PIS from the PIS supply tank at an adequate step in the chemical plant, the feeding opening connected to a next step in the chemical plant through the medium of a pipeline.

2. An apparatus according to claim 1, further comprising a powder-supplying device between the polymerization inhibitor hopper and the preparation tank.

3. An apparatus according to claim 1 further comprising a line for introducing a concentration-adjusting liquid to the preparation tank, a flow rate detector and a valve on the upstream side of said line for the introduction of the concentration-adjusting liquid, or a means for controlling a polymerization inhibitor concentration uniformly.

4. An apparatus according to claim 1 further comprising a means for controlling the liquid level in the preparation tank by introducing the concentration-adjusting liquid into the preparation tank, or a means for introducing a polymerization inhibitor into the preparation tank thereby controlling the polymerization inhibitor concentration at a fixed concentration.

5. An apparatus according to claim 1, wherein one tank is divided with a partition plate into at least two chambers forming the preparation tank and the supply tank.

6. An apparatus according to claim 5, wherein the pipeline connecting the preparation tank to the supply tank is sloped to allow the flow of the solution from the preparation tank to the supply tank and internally connected through the medium of the partition plate.

7. An apparatus according to claim 6, wherein the portion of the PIS of adjusted concentrations in the supply tank and the preparation tank are caused by dint of the difference of height.

8. An apparatus according to claim 1, wherein the supply tank and the preparation tank are disposed vertically connected with the pipeline, wherein an upper one of the two tanks is the preparation tank for preparation of a PIS and the lower one of the two tanks is the supply tank for storing the PIS produced at a fixed concentration in the preparation tank and supplying the solution stably to the next step.

9. An apparatus according to claim 8, further comprising:
   a control device;
   an on-off valve connected in line on the pipeline connected serially between the tanks;
   the control device connected to an on-off valve; and
   liquid level detectors for detecting the liquid level in the tank furnished to the preparation tank and the supply tank and connected to the control device.

10. An apparatus according to claim 1, wherein the supply tank and the preparation tank are disposed in a parallel configuration arranged laterally, and further comprising:
    a liquid pump on the pipeline connected serially between the preparation tank and the supply tank.

11. An apparatus according to claim 1, wherein one tank is divided with a partition plate into at least two chambers forming the preparation tank and the supply tank, and wherein the preparation tank is capable of being used as a main tank for preparing a PIS and supplying the PIS to the next step, and the supply tank is capable of being used as a sub tank for storing the PIS brought at an adjusted concentration from the main tank and supplying the PIS supplementarily to the next step exclusively during the preparation of the PIS in the main tank.

12. An apparatus according to claim 11, wherein the feed opening is on a lower part of the main tank for enabling the PIS to be extracted from the main tank, wherein the feed opening is connected to the next step through the medium of the pipeline and a second feed opening is connected to a lower part of the sub tank, wherein the PIS can be extracted from the sub tank.

13. An apparatus according to claim 11, further comprising a pipeline internally connected and sloped to advance the flow of liquid from the sub tank to the main tank.

14. A method for preparation and supply of polymerization inhibitor solution (PIS) used in a chemical plant handling an easily polymerizable compounds and supplying the PIS to a next another adequate step in the chemical plant, comprising the steps of:
    preparing the PIS using the apparatus set forth in claim 11; and
    supplying the PIS to a next adequate step in the chemical plant.

15. A method for the preparation and supply of a polymerization inhibitor solution (PIS) which is used in a chemical plant handling an easily polymerizable compound for supplying the PIS to a next adequate step in chemical plant using the apparatus of claim 1, comprising the following steps:
    introducing a concentration-adjusting liquid (CAL) into the preparation tank while the supply tank is controlled so as to retain a liquid therein at a fixed level;
    introducing a polymerization inhibitor into the preparation tank while the preparation tank is controlled so as to retain a polymerization inhibitor concentration at a fixed level;
    stirring the contents in the preparation tank to prepare a polymerization inhibitor solution; and
    transferring part of the polymerization inhibitor solution (PIS) from the preparation tank to the supply tank through a pipeline connected serially between the tanks.

16. A method for preparation and supply of polymerization inhibitor solution (PIS) which is used in a chemical plant handling an easily polymerizable compounds comprising the steps of:
    preparing a PIS using the apparatus of claim 8; and
    supplying the PIS to a next adequate step in the chemical plant.

17. A apparatus for the preparation and supply of a polymerization inhibitor solution (PIS) by adjusting a polymerization inhibitor with a concentration-adjusting liquid (CAL), which is used in a chemical plant handling an easily polymerizable compound, and continuing stable supply of the solution to an adequate step, comprising:

a plurality of tanks wherein at least two of the tanks are disposed in parallel and are independent from the other tanks, wherein the individual tanks are adapted to perform both preparation and supply, and the tank for supply of the PIS to the next step is switched sequentially to an optimized one of the tanks.

18. An apparatus according to claim 17, wherein the plurality of tanks are disposed so that one of the tanks produces the PIS and another tank supplies the PIS.

19. An apparatus according to claim 18, further comprising means to effect continuous fixed-supply of the solution.

20. An apparatus according to claim 17, where the two tanks are two independent tanks both capable of preparing a PIS and, at the same time, supplying the produced PIS to the next step.

* * * * *